United States Patent
Hoshino et al.

(10) Patent No.: US 12,445,741 B2
(45) Date of Patent: Oct. 14, 2025

(54) MOVABLE APPARATUS AND INSTALLATION METHOD FOR IMAGING DEVICE

(71) Applicant: CANON KABUSHIKI KAISHA, Tokyo (JP)

(72) Inventors: Hironobu Hoshino, Tokyo (JP); Tomoaki Tsuchiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 18/472,285

(22) Filed: Sep. 22, 2023

(65) Prior Publication Data
US 2024/0114253 A1   Apr. 4, 2024

(30) Foreign Application Priority Data

Sep. 29, 2022 (JP) .................. 2022-157148

(51) Int. Cl.
*H04N 23/90* (2023.01)
*B60R 1/22* (2022.01)
*H04N 13/204* (2018.01)

(52) U.S. Cl.
CPC ................ *H04N 23/90* (2023.01); *B60R 1/22* (2022.01); *B60R 2300/107* (2013.01); *H04N 13/204* (2018.05)

(58) Field of Classification Search
None
See application file for complete search history.

(56) References Cited

U.S. PATENT DOCUMENTS

| | | | |
|---|---|---|---|
| 7,605,856 B2 | 10/2009 | Imoto | |
| 2004/0189831 A1* | 9/2004 | Shibatani | H04N 23/69 348/240.99 |
| 2020/0374457 A1* | 11/2020 | Yatsuri | G02B 13/06 |
| 2021/0309232 A1* | 10/2021 | Goto | G06V 20/58 |

(Continued)

FOREIGN PATENT DOCUMENTS

| | | |
|---|---|---|
| JP | 2011-193485 A | 9/2011 |
| JP | 6349558 B1 | 7/2018 |

(Continued)

OTHER PUBLICATIONS

Notice of Reasons for Refusal issued by the Japanese Patent Office on Aug. 6, 2024 in corresponding JP Patent Application No. 2022-157151, with English translation.

(Continued)

*Primary Examiner* — Eileen M Adams
(74) *Attorney, Agent, or Firm* — Carter, DeLuca & Farrell LLP

(57) ABSTRACT

The imaging device images a wide range with high resolution, in a movable apparatus, an imaging device including an optical system forming an optical image having a low resolution region near an optical axis and a high resolution region outside the low resolution region on a light reception surface of an imaging element is installed at an installation position for imaging at least one of a horizontal direction in a rear of one side of the movable apparatus, one direction in a left-right horizontal direction behind a driver seat of the movable apparatus, and a downward direction behind the movable apparatus, with the high resolution region of the optical system.

1 Claim, 14 Drawing Sheets

(56) References Cited

U.S. PATENT DOCUMENTS

2022/0212602 A1\* 7/2022 Watanabe ............... B60R 11/04
2023/0394845 A1   12/2023 Tsuchiya
2024/0114252 A1\* 4/2024 Hoshino .................. B60R 1/26

FOREIGN PATENT DOCUMENTS

| JP | 2019-158741 A | 9/2019 |
| JP | 2020-164067 A | 10/2020 |
| JP | 2022-157151 A | 10/2022 |
| WO | 2023/276819 A1 | 1/2023 |

OTHER PUBLICATIONS

Notice of Reasons for Refusal issued by the Japanese Patent Office on Mar. 5, 2024 in corresponding JP Patent Application No. 2022-157148.

Extended European Search Report issued by the European Patent Office on Mar. 4, 2024 in corresponding EP Patent Application No. 23199075.5.

\* cited by examiner

MOVABLE APPARATUS AND INSTALLATION METHOD FOR IMAGING DEVICE

BACKGROUND OF THE INVENTION

Field of the Invention

The present invention relates to a movable apparatus such as an automobile, and a method of installing an imaging device.

Description of the Related Art

In recent years, a camera monitor system (CMS) technology that replaces mirrors mounted on an automobile with electronic mirrors has been promoted. A plurality of imaging devices (cameras) installed for a CMS may be installed to be able to film (image) all directions as eyes of an electronic system for checking safety.

Further, the UN regulations UN-R46 (regulations for indirect vision for automobiles) defines blind spots of a driver, and the CMS is required to perform imaging and be installed to reduce the blind spots, like existing mirrors.

Further, a vehicle having a cross traffic alert (CTA) function includes cameras capable of imaging left-right directions on the front and rear sides of the vehicle with high resolution so that the cameras can detect the approach of other vehicles crossing in front or to the rear of the vehicle.

Further, an automobile including a forward or rearward monitoring device (a front monitor or a back monitor) includes a wide-angle camera capable of imaging a wide range in front of or behind the vehicle. Japanese Patent No. 6349558 discloses imaging behind a vehicle using a camera including an optical system capable of imaging a part of an imaging region with high resolution.

However, since the camera with high resolution in the part of the imaging region used in Japanese Patent No. 6349558 cannot image a wide range with high resolution, a large number of cameras need to be prepared to cover the wide range if it is necessary to image the wide range with high resolution.

SUMMARY OF THE INVENTION

A movable apparatus of an aspect of the present invention is characterized in that an imaging device including an optical system forming an optical image having a low resolution region near an optical axis and a high resolution region outside the low resolution region on a light reception surface of an imaging element is installed at an installation position for imaging at least one of a horizontal direction in a rear of one side of the movable apparatus, one direction in a left-right horizontal direction behind a driver seat of the movable apparatus, and a downward direction behind the movable apparatus, with the high resolution region of the optical system.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
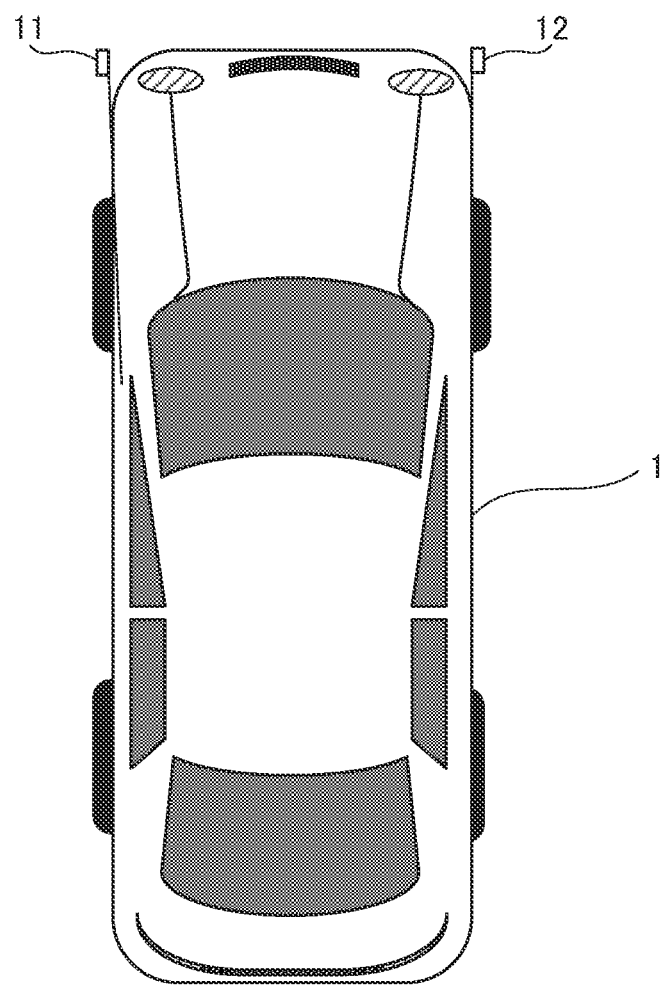
FIG. 1 is a diagram illustrating a positional relationship between a camera unit and a vehicle in First Embodiment.

In First Embodiment, a method of installing a camera unit that captures a high resolution video for an electronic side mirror and a front CTA, and captures a video for a forward monitoring device will be described. FIG. 1 is a diagram illustrating a positional relationship between the camera unit of First Embodiment and a vehicle.

In the example illustrated in FIG. 1, a camera unit 11 as a first imaging device is installed on the front left side of a vehicle 1, which is an automobile, and a camera unit 12 is installed on the front right side. In description of Present Embodiment, two camera units are installed in the vehicle 1, but the number of camera units is not limited to two and at least one camera unit is sufficient. Further, a camera unit capable of imaging a plurality of required image capturing ranges and high resolution imaging directions need only be installed.

Camera units 11 and 12 are installed so that the camera units 11 and 12 can image a rear of a side of the vehicle 1 to capture a video for electronic side mirrors, image either to the left or right in front of the vehicle 1 to capture a video for a front CTA, and capture a video under the front for a forward monitoring device of the vehicle 1.

Optical systems of the camera units 11 and 12 in Present Embodiment generate an image circle having a characteristic that a resolution at peripheral angles of view is higher than that at a center in an optical axis direction, and form an image on a video element, which will be described below. In Present Embodiment, the optical characteristics of the camera units 11 and 12 are assumed to be substantially the same, and characteristics thereof will be described as an example using FIG. 2.

FIGS. 2A and 2B are diagrams illustrating optical characteristics of the optical system of the camera unit 11 in Present Embodiment. FIG. 2A is a diagram illustrating a contour of image circles of the optical system of the camera unit 11 and an image height y at each half angle of view on a light reception surface of an imaging element.

FIG. 2B is a diagram illustrating projection characteristics of an image circle representing a relationship between the image height y of the optical system of the camera unit 11 and a half angle of view θ. In FIG. 2B, a half angle of view (an angle formed by an optical axis and an incident light beam) θ is shown as a horizontal axis, and an imaging height (image height) y on a light reception surface (image plane) of the imaging element of the camera unit 11 is shown as a vertical axis.

As illustrated in FIG. 2B, in Present Embodiment, projection characteristics y(θ) are different between a region with less than a predetermined half angle of view θa and a region with the half angle of view θa or more. When an amount of increase in the image height y with respect to the half angle of view θ per unit, that is, an index expressed by a differential value dy(θ)/dθ at the half angle of view θ in the projection characteristic y(θ) is defined as the resolution, the resolution becomes higher when a slope of the projection characteristic y(θ) in FIG. 2B increases.

Further, it can be said that the resolution increases when an interval of the image height y at each half angle of view in the contour shape increases in FIG. 2A. Thus, the optical system of the camera unit 11 has optical characteristics that the resolution of the region with the half angle of view of θa or more is higher than the resolution of the region with the half angle of view less than θa.

It is assumed that the projection characteristic y(θ) of the optical system illustrated in FIGS. 2A and 2B satisfies, for example, a condition of Equation 1. That is, when the image height of the optical system is y, f is a focal distance of the optical system, θ is a half angle of view, and θ max is the maximum of θ, projection characteristics y(θ) satisfy the following condition $$0.2 < 2*f \tan(\theta \max/2)/y(\theta \max) < 0.92 \quad \text{(Equation 1)}$$

In Present Embodiment, a peripheral region of the light reception surface in which the half angle of view θ is θa or more is called a high resolution region 10a, and a central region of the light reception surface in which the half angle of view θ is less than θa is called a low resolution region 10b. That is, the optical system of Present Embodiment has projection characteristics that the image height with respect to an angle of view per unit is higher at an angle of view of the high resolution region than at an angle of view of the low resolution region near the optical axis, and has the low resolution region near the optical axis and the high resolution region outside the low resolution region.

In Present Embodiment, a circle of a boundary between the high resolution region 10a and the low resolution region 10b is called a resolution boundary, and a boundary image on the display screen corresponding to the resolution boundary is called a display resolution boundary or simply a boundary image. However, the boundary between the high resolution region 10a and the low resolution region 10b is not limited to the circle, and may be an ellipse having different projection characteristics y(θ) for each radial direction, or a distorted shape.

In Present Embodiment, a lens with the above characteristics is called a stereoscopic projection lens, and a camera unit with the stereoscopic projection lens attached thereto is called a stereoscopic projection camera.

In Present Embodiment, it is assumed that a centroid of the low resolution region 10b and a centroid of the high resolution region 10a on the light reception surface of the imaging element of the camera unit substantially overlap, and the centroid of the high resolution region 10a substantially matches a position at which an optical axis of the optical system of the camera unit intersects with the light reception surface of the imaging element.

However, for example, the centroid of the light reception surface of the imaging element and the centroid of the high resolution region 10a may be shifted in a predetermined direction, and the centroid of the high resolution region 10a may be shifted from the position at which the optical axis of the optical system intersects the light reception surface.

Figure 3:
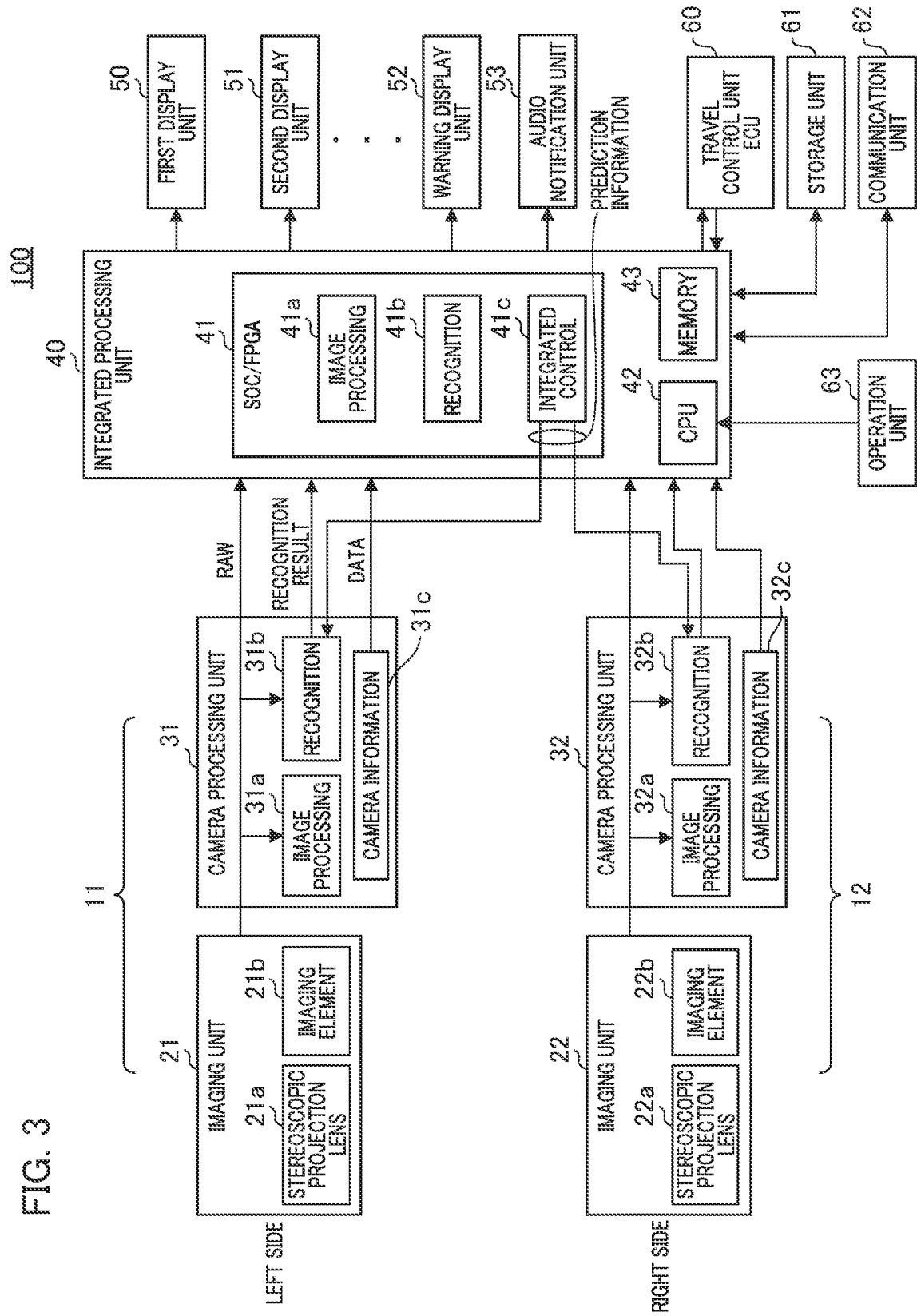
FIG. 3 is a diagram illustrating an image processing system 100 of First Embodiment.

Next, a configuration of the image processing system in Present Embodiment will be described using FIG. 3. FIG. 3 is a diagram illustrating the image processing system 100 of First Embodiment, and the image processing system 100 of FIG. 3 is mounted on the vehicle 1.

The camera unit 11 includes an imaging unit 21 and a camera processing unit 31, and the camera unit 12 includes an imaging unit 22 and a camera processing unit 32. The imaging units 21 and 22 include stereoscopic projection lenses 21a and 22a, and imaging elements 21b and 22b such as CMOS image sensors.

The stereoscopic projection lenses 21a and 22a, which are the optical systems of the camera units 11 and 12, include one or more optical lenses, and have optical characteristics as illustrated in FIGS. 2A and 2B. Further, the stereoscopic projection lenses 21a and 22a form respective optical images on light reception surfaces of the imaging elements 21b and 22b.

The imaging elements 21b and 22b function as imaging units, and photoelectrically convert the formed optical image to output an imaging signal. For example, R, G, and B color filters are arranged in a Bayer array for each pixel on the light reception surfaces of the imaging elements 21b and 22b, and R, G, and B pixel signals are sequentially output as imaging signals from the imaging unit 21.

The camera processing units 31 and 32 have a function of processing the imaging signals output from the imaging units 21 and 22, respectively. The camera processing units 31 and 32 include image processing units 31a and 32a, recognition units 31b and 32b, and camera information units 31c and 32c, respectively.

A CPU as a computer and a memory having a computer program stored therein as a storage medium are built into the camera processing units 31 and 32, and the CPU executes the computer program in the memory. Accordingly, processes in the camera processing units 31 and 32 are executed.

The camera processing units 31 and 32 are not limited to the above configuration, and the image processing units 31a and 32a or the recognition units 31b and 32b may be configured of, for example, hardware such as a dedicated circuit (ASIC) or a processor (a reconfigurable processor or a DSP).

The image processing units 31a and 32a perform various types of image correction processing such as white balance adjustment, gain and offset adjustment, gamma processing, color matrix processing, reversible compression processing, and distortion correction processing on the imaging signals output from the imaging units 21 and 22. The image processing units 31a and 32a are configured to perform distortion correction on the image signal of the low resolution region 10b and not to perform distortion correction on the image signal of the high resolution region 10a.

Further, for example, image data input according to a Bayer array from the imaging units 21 and 22 are subjected to debayer processing and converted into image data in a RGB raster format. Some of the image processing as described above may be performed by other blocks of the image processing system 100 other than the image processing units 31a and 32a.

The recognition units 31b and 32b have a function of performing image recognition of a predetermined target object (for example, an automobile, person, or obstacle) from the image signals subjected to image processing by the image processing units 31a and 32a, respectively, and outputting a first image recognition result to the integrated processing unit 40. For example, the image recognition result is transmitted to the integrated processing unit 40 as a recognition result including a set of a type of target object and coordinates.

Further, the recognition units 31b and 32b may receive prediction information including information on a type of target object and a movement direction of the target object or preferential recognition region information from the integrated control unit 41c of the integrated processing unit 40, and perform image recognition processing.

The camera information units 31c and 32c function as holding unit configured to hold camera information such as characteristic information on characteristics of the optical image or position and posture information of the camera units, and hold the camera information of the camera units 11 and 12 in a memory in advance. Further, the camera information units 31c and 32c may hold information from, for example, various sensors provided in the camera units 11 and 12.

The held camera information includes, for example, information such as characteristic information of the stereoscopic projection lenses 21a and 22a, the number of pixels of the imaging elements 21b and 22b, attachment position information and posture (pitch, roll, yaw, or the like) of the camera units 11 and 12 at vehicle coordinates, the optical axis direction, and an imaging range. The camera information may also include information such as gamma characteristics, sensitivity characteristics, frame rate, and image format of a video output from the camera processing unit 31.

The attachment position information of the camera unit is stored as relative coordinates with respect to the vehicle 1 in a memory in the camera information unit in advance since an attachment position with respect to the vehicle is often determined for each camera unit.

Further, the camera information may be information unique to the imaging units 21 and 22 (for example, aberration characteristics of lenses or noise characteristics of imaging elements). The camera information is transmitted to the integrated processing unit 40, and is referenced when the integrated processing unit 40 performs, for example, image processing necessary for displaying on the display unit.

The integrated processing unit 40 has a function of displaying video signals obtained from the camera units 11 and 12 on a display device such as a first display unit 50 and a second display unit 51, and a function of notifying a warning display unit 52 or an audio notification unit 53 of video signals. Further, the integrated processing unit 40 has, for example, a function of recognizing an image of a target object crossing a boundary between imaging ranges of the camera units 11 and 12.

The integrated processing unit 40 includes a system on chip (SOC)/field programmable gate array (FPGA) 41, a CPU 42 as a computer, and a memory 43 as a storage medium. In the description of Present Embodiment, the integrated processing unit 40 is housed in a housing separate from the camera unit.

Some or all of functional blocks included in the integrated processing unit 40 or the like may be realized by hardware or may be realized by the CPU 42. As the hardware, a dedicated circuit (ASIC), a processor (a reconfigurable processor or a DSP), or the like can be used. The CPU 42 performs various controls of the entire image processing system 100 by executing a computer program stored in the memory 43.

The SOC/FPGA 41 includes an image processing unit 41a, a recognition unit 41b, and an integrated control unit 41c. The image processing unit 41a has a function of performing image processing such as resolution conversion for display on a display device, on the basis of the respective image signals acquired from the camera processing units 31 and 32 and the camera information.

The camera information includes optical characteristics of the stereoscopic projection lenses 21a and 22a, the number of pixels of the imaging elements 21b and 22b, photoelectric conversion characteristics, γ characteristics, sensitivity characteristics, format information of the image signal, and coordinates of an installation position or posture information of the camera unit at vehicle coordinates, as described above.

For example, the image processing unit 41a combines the image signal of the low resolution region 10b and the image signal of the high resolution region 10a of the imaging units 21 and 22 subjected to the distortion correction with each other to connect the image signals smoothly and form an overall image of the imaging units 21 and 22. Further, the image processing unit 41a performs image processing such as image rotation on the basis of information on a disposition position and posture of the camera, particularly, in the camera information, and transmits the image signal to the display device.

The recognition unit 41b performs the image recognition processing on a combination image obtained by connecting the images from the imaging units 21 and 22, and image-recognizes a predetermined target object (for example, an automobile, person, or obstacle) in the combination image obtained from the imaging units 21 and 22 to generate a second image recognition result.

In this case, recognition results (a type and coordinates of the target object) of the recognition units 31b and 32b may also be referred to. In the above description, the recognition unit 41b performs the image recognition on the combination image obtained from the imaging units 21 and 22, but may not necessarily perform the image recognition on the combination image.

The description will be continued on the assumption that the recognition unit 41b can output the second image recognition result as a result of image-recognizing an image signal of a region wider than a partial region subjected to image recognition by a first image recognition unit in an image signal acquired by an image acquisition unit.

The integrated control unit 41c functions as an integrated processing unit configured to output an image recognition result integrated on the basis of the reliability of the first image recognition result and the reliability of the second image recognition result. For example, if the recognition result of the recognition units 31b and 32b and the recognition result of the recognition unit 41b are different, the integrated control unit 41c adopts the recognition result with higher reliability and outputs an integrated image recognition result.

For example, a proportion of the target object in the image recognized by the recognition units 31b and 32b is compared with a proportion closed in the screen of the same target object recognized by the recognition unit 41b, and a recognition result on a greater proportion side is determined to be more reliable and is adopted.

The integrated control unit 41c has a function of forming a video signal for displaying a desired image on the first display unit 50, the second display unit 51, or the like from the entire images of the imaging units 21 and 22 subjected to the image processing. The integrated control unit 41c also generates a CG for, for example, information on a frame for highlighting the recognized target object or a type, size, position, speed, or the like of the target object, or a warning.

Further, a CG of a boundary image for displaying the boundary may be generated on the basis of characteristic information of the optical system such as display resolution boundary information acquired from the camera information units 31c and 32c. Display processing for superimposing these CG or text on an image, for example, is performed. Here, the first display unit 50, the second display unit 51, or the like functions as a display unit, and displays an image signal or an integrated image recognition result.

Further, the integrated control unit 41c communicates with a travel control unit (ECU) 60 or the like via communication unit (not illustrated) provided inside using protocols such as CAN, FlexRay, or Ethernet. Accordingly, display processing for appropriately changing information to be displayed on the basis of a vehicle control signal received from the travel control unit (ECU) 60 or the like is performed. That is, for example, it is possible to change, for example, a range of an image to be displayed on the display unit according to a moving state of the vehicle acquired by the vehicle control signal.

The traveling control unit (ECU) 60 is a unit that is mounted on the vehicle 1 and includes a computer or memory for comprehensively performing drive control, direction control, or the like of the vehicle 1. From the travel control unit (ECU) 60, for example, a travel speed, travel direction, shift lever, shift gear, turn signal status, direction of the vehicle from a geomagnetic sensor or the like, information on travel (movement state) of the vehicle such as GPS information, or the like is input to the integrated processing unit 40 as the vehicle control signal.

Further, the integrated control unit 41c may include a function of transmitting information such as a type, position, movement direction, or movement speed of a predetermined target object (such as an obstacle) recognized by the recognition unit 41b to the traveling control unit (ECU) 60.

Accordingly, the travel control unit (ECU) 60 performs necessary controls such as stopping a vehicle, driving the vehicle, and avoidance of obstacles such as changing a direction of travel. The traveling control unit (ECU) 60 functions as a movement control unit configured to control the movement of the vehicle on the basis of the integrated image recognition result.

The first display unit 50 is, for example, a display device that is installed near a center in a vehicle width direction above the front of a driver seat of the vehicle 1 with a display screen directed to the rear of the vehicle, and functions as an electronic rearview mirror. The first display unit 50 may be configured so that the first display unit 50 can be used as a mirror when the first display unit 50 is not used as a display, by using a half mirror or the like.

Further, the first display unit 50 may be configured to include a touch panel or operation buttons, acquire an instruction from the user, and output the instruction to the integrated control unit 41c. Further, the first display unit 50 can be used as an electronic side mirror for checking left and right obstacles or as a display device displaying an image for front CTA, instead of an optical side mirror of the related art.

The first display unit 50 receives and displays a video signal with an angle of view required for a display according to a purpose of the first display unit generated by the integrated control unit 41c.

The second display unit 51 is a display device that is installed, for example, around an operation panel near the center in the vehicle width direction in front of the driver seat of the vehicle 1, and functions as a display device for displaying, for example, a downward direction in front of the vehicle.

The second display unit 51 also functions as a display device that receives a necessary imaging region generated according to a purpose, similar to the first display unit. The integrated control unit 41c receives and displays a signal necessary for a display according to the purpose of the second display unit.

For example, the second display unit can also display various control signals from a navigation system, an audio system, and the travel control unit (ECU) 60. Further, the second display unit may be configured to include a touch panel or operation buttons so that an instruction from the user can be acquired.

Further, the second display unit 51 may be, for example, a display unit of a tablet terminal, and can perform a display by connecting to the integrated processing unit 40 by wire, or can wirelessly receive an image through the communication unit 62 and display the image. Further, a liquid crystal display, an organic EL display, or the like can be used as display elements of the first display unit 50 and the second display unit 51, and the number of display units is not limited to one.

The integrated control unit 41c determines whether a movable apparatus is included in the image on the basis of the recognition results output by the recognition units 31b and 32b and the recognition unit 41b, and outputs the recognition result. The movable apparatus here is, for example, a bicycle, a pedestrian, or another vehicle, and is called a detection target in Present embodiment. The recognition result output by the integrated control unit 41c includes the presence or absence of a detection target, a type and coordinates of the detection target, and speed information.

The warning display unit 52 functions as warning display means, and issues, for example, a side collision warning to the driver using visual information, on the basis of the recognition result output from the integrated control unit 41c. The warning display unit 52 may be configured of, for example, an LED, and may be configured to light up or blink if the recognition result includes information indicating that the detection target exists.

Further, the warning display unit 52 may be configured of a display such as a liquid crystal. In this case, if the recognition result includes information indicating that the detection target exists, an icon, text information, or the like is output on the display. Further, the warning display unit 52 can be installed, for example, near the end in the vehicle width direction in front of the driver seat of the vehicle 1 with the display screen directed to the driver.

Further, the warning display unit 52 may be installed, for example, near the first display unit 50 and the second display unit 51, or may be configured to substitute for the first display unit 50 and the second display unit 51. The audio notification unit 53 functions as an audio notification means, and outputs sound on the basis of the recognition result output from the integrated control unit 41c. For example, a speaker can be used to output sound for notification to the driver. It is desirable to install the audio notification unit 53 near the end in the vehicle width direction in front of the driver seat of the vehicle 1, for example.

Further, the integrated control unit 41c functions as a warning condition determination means, and performs control to change content of an alarm output by the warning display unit 52 or the audio notification unit 53 on the basis of the coordinates or speed of the detection target obtained by the recognition units 31b and 32b and the recognition unit 41b. Further, the integrated control unit 41c may be configured to control the warning display unit 52 so that a warning level is higher when a distance to the detection target is shorter.

For example, it is desirable to control the audio notification unit 53 so that a volume of the notification increases as a distance between the detection target and the side of the vehicle is short. The integrated control unit 41c may be configured to determine whether or not a traveling speed of the host vehicle input from the traveling control unit (ECU) 60 is equal to or smaller than a predetermined value, and perform a warning display using the warning display unit 52 or a warning notification using the audio notification unit 53 only if the traveling speed is equal to or smaller than the predetermined value.

If the traveling speed of the host vehicle is high, the detection target is likely not to be correctly recognized, and thus, with such a configuration, it is possible to improve a possibility that correct side detection will be performed. In this case, it is desirable for the predetermined value of the traveling speed of the host vehicle to be 30 km/h.

Further, if the detection target is moving, there is a higher possibility of colliding with the vehicle, unlike a case in which the detection target is stationary. Therefore, the integrated control unit 41c may determine whether the speed of the detection target is within a predetermined range, and perform the warning display using the warning display unit 52 or the warning notification using the audio notification unit 53 only if the integrated control unit 41c determines that the speed of the detection target is within the predetermined range. In this case, it is desirable for the predetermined range of the speed of the predetermined detection target to be 5 km/h or more and 20 km/h or less.

Further, the integrated control unit 41c determines whether the host vehicle is turning right or left on the basis of movement direction information of the host vehicle output from the travel control unit (ECU) 60, and performs the warning display using the warning display unit 52 or the warning notification using the audio notification unit 53 only if the vehicle is turning right or left.

In Present Embodiment, the integrated processing unit 40 is mounted on the vehicle 1, but processes of some of the image processing unit 41a, the recognition unit 41b, and the integrated control unit 41c of the integrated processing unit 40 may be performed by an external server or the like via a network, for example.

In this case, for example, the imaging units 21 to 24 as image acquisition units are mounted on the vehicle 1, but for example, some of the functions of the camera processing units 31 and 32 and the integrated processing unit 40 can be processed by the external server or the like. Further, the travel control unit (ECU) 60 can have some or all of the functions of the integrated processing unit 40.

61 denotes a storage unit, which records an entire image generated by the integrated processing unit 40 for each of the imaging units 21 and 22. Further, a CG of a predetermined frame, text, and warning indicating the recognized target object, and images superimposed with the CG and displayed on, for example, the first display unit 50 and the second display unit 51 are recorded together with, for example, a time or GPS information. The integrated processing unit 40 can also reproduce past information recorded on the storage unit 61 and display the past information on the first display unit 50 or the second display unit 51.

62 denotes a communication unit, which is a unit for communicating with the external server or the like via a network, and can transmit information before being recorded in the storage unit 61, past travel history information recorded in the storage unit 61, and the like to the external server or the like and store the information in the external server or the like.

Further, the image can be transmitted to an external tablet terminal or the like and displayed on the second display unit 51, which is the display unit of the tablet terminal, as described above. It is also possible to acquire traffic jam information or various types of information from the external server or the like and display the information on the first display unit 50 or the second display unit 51 via the integrated processing unit 40.

Reference numeral 63 denotes an operation unit, which inputs various instructions to the image processing system through an operation of a user. The operation unit includes, for example, a touch panel or operation buttons.

Figure 4A:
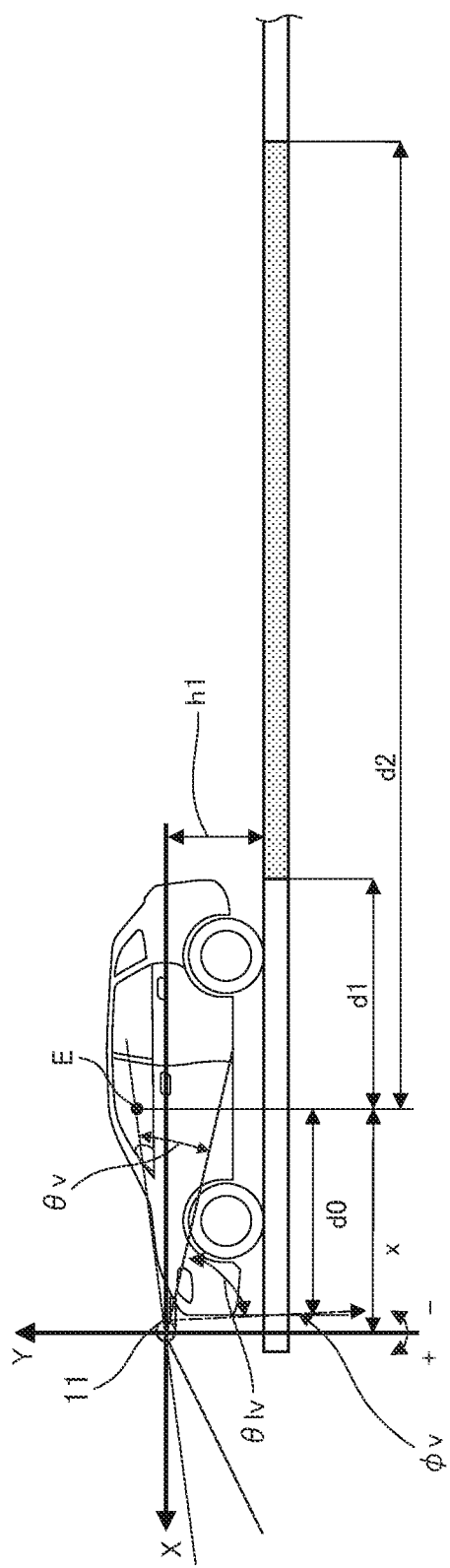
FIGS. 4A and 4B illustrate a relationship between the characteristics of the optical system of the camera unit 11 installed in a vehicle 1 of First Embodiment and an imaging region required for a display of electronic side mirrors and a front CTA.
Figure 4B:
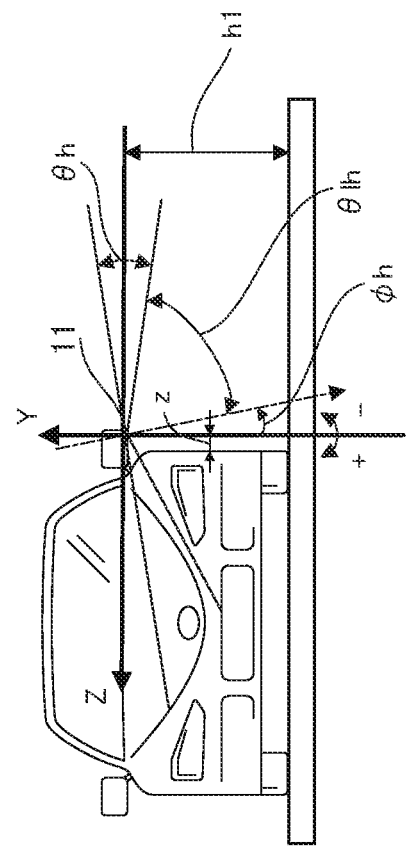

Next, a relationship between characteristics and disposition of the camera unit 11 installed on the left front side and the camera unit 12 installed on the right front side will be described. FIGS. 4A and 4B illustrate a relationship between the characteristics of the optical system of the camera unit 11 installed in the vehicle 1 of First Embodiment and an imaging region required for a display of electronic side mirrors and a front CTA. FIG. 4A is a side view of the vehicle 1 viewed from the side, and FIG. 4B is a front view of the vehicle viewed from the front.

Origins of X, Y, and Z directions in FIG. 4 is an installation position of the camera unit 11, and the X direction is a forward direction of the vehicle in a horizontal direction, as illustrated in FIG. 4A. The Z direction is a left direction in the horizontal direction toward the vehicle 1, as illustrated in FIG. 4B. The Y direction is an upward direction in a vertical direction, as illustrated in FIGS. 4A and 4B.

In an XY plane of FIG. 4A, a positive angle is toward the X direction and a negative angle is toward a −X direction with reference to the vertical direction. In a YZ plane of FIG. 4B, a positive angle is toward the Z direction and a negative angle is toward a −Z direction with reference to the vertical direction. E on the XY plane of FIG. 4A denotes a viewpoint position of the driver, which is an eye position of the driver at a seated position or a center position of a driver seat surface.

A relationship between an optical axis of the camera unit 11 and an imaging angle of view will be described using the above definition. φv, θv, and θlv on the XY plane of FIG. 4A will be described. φv is an optical axis direction of the camera unit 11 and is an angle from a vertical direction.

In Present Embodiment, an optical axis of the imaging device is downward from an installation position. θv is an angle of view of the high resolution region 10a of the camera unit 11. θlv is an angle of view of the low resolution region 10b of the camera unit 11.

φh, θh, and θlh on the YZ plane in FIG. 4B will be described. φh is the optical axis direction of the camera unit 11 and is an angle from the vertical direction. θh is the angle of view of the high resolution region 10a of the camera unit 11. θlh is the angle of view of the low resolution region 10b of the camera unit 11.

A positional relationship of the camera unit 11 will be described using the above definition. x in the XY plane of FIG. 4A is a horizontal distance between the camera unit 11 and the viewpoint position E of the driver. h1 is a vertical distance between the camera unit 11 and the ground.

z in the YZ plane of FIG. 4B is a distance between an installation position (first installation position) of the camera unit 11 and the side of the vehicle 1. Here, the imaging region (a prescribed region on the rear of the side of the vehicle) required for an electronic side mirror display will be described with reference to FIGS. 4 and 5.

Figure 5:
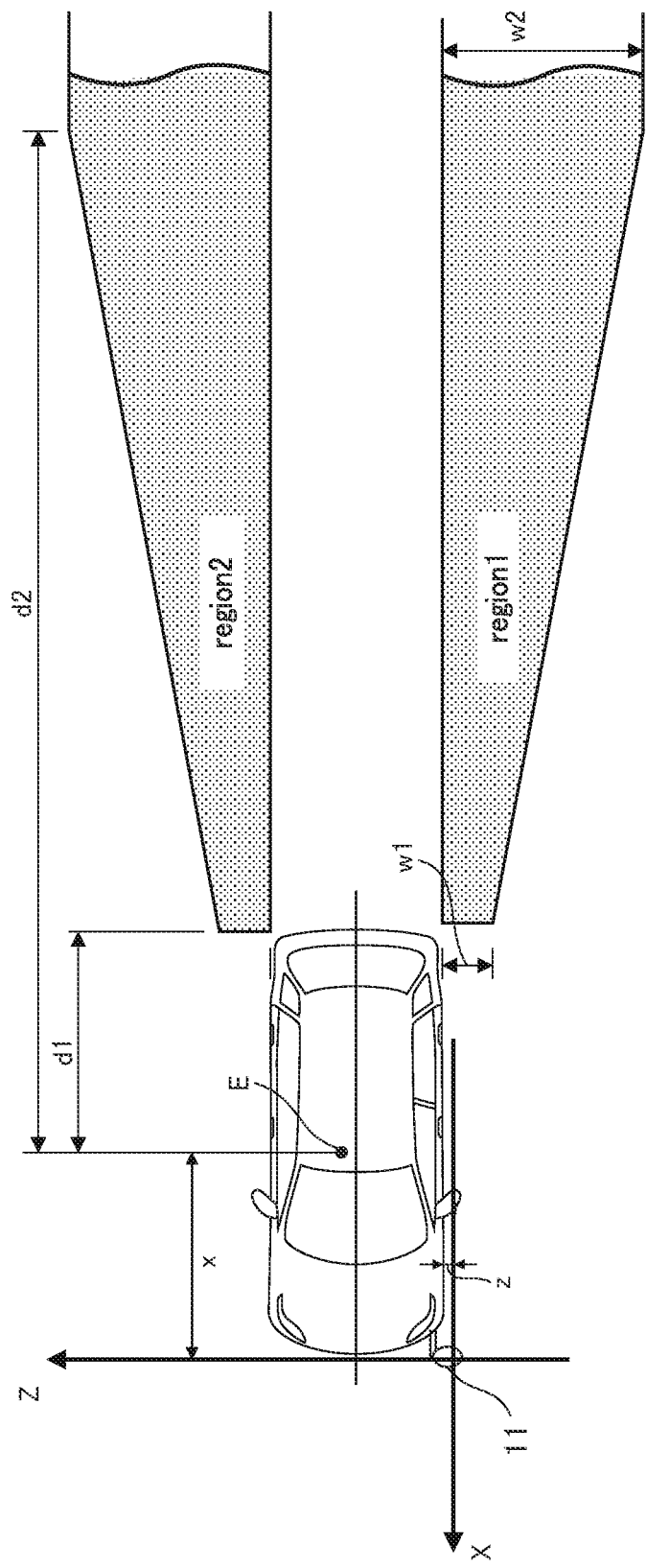
FIG. 5 is a top plan view of the vehicle 1 viewed from above in First Embodiment.

FIG. 5 is a plan view of the vehicle 1 viewed from above in First Embodiment, and X and Z directions correspond to those in FIG. 4 with the installation position of the camera unit 11 as an origin. The prescribed region on the rear of the side of the vehicle is a region on the ground as shown by hatching in FIGS. 4A and 5, and is a region that the driver needs to check with a side mirror of the vehicle.

The prescribed region on the rear of the side of the vehicle is a region on the ground defined by a width w1 from the side of a vehicle body at a distance d1 behind the viewpoint position E of the driver, and a width w2 from the side of the vehicle body at a distance d2, a region on the passenger seat side is region1, and a region on the driver seat side is region2. region1 and region2 have shapes symmetrical with respect to a longitudinal center line of the vehicle 1.

Installation conditions under which the camera unit 11 installed on the passenger seat side can image the horizontal direction with high resolution while imaging the prescribed region region1 on the rear of the side of the vehicle will be described. Since a distant side of region1 which is the prescribed region on the rear of the side of the vehicle extends to infinity on the vehicle rear side, the camera unit 11 is installed to be able to image the infinity, that is, the horizontal direction of the width w2.

Further, in order to check the image of a distant object away from the driver with the image captured by the camera, it is desirable for the camera unit 11 to be installed so that the camera unit 11 can image a ground direction to a horizontal direction in the vicinity with high resolution.

Therefore, in First Embodiment, the camera unit 11 is installed such that the following installation condition (Equation 2) is satisfied so that a horizontal angle (−90°) is included in a range of the high resolution region 10a (φv−θv−θlv) and (angle of φv−θlv) of the camera unit 11.

$$\varphi v - \theta v - \theta lv < -90° < \varphi v - \theta lv \quad \text{(Equation 2)}$$

Further, the camera unit 11 is installed such that a tip region (a region of the width w1) in a traveling direction of the prescribed region region1 at a position far away backward by d1 from the viewpoint position E is included in the imaging angle of view, in addition to Equation 2 so that the prescribed region region1 on the side of the vehicle is included in the imaging angle of view of the camera unit 11.

That is, an angle (−A tan((x+d1)/h)) in a tip region direction of region1 far away backward by d1 from the viewpoint position E is installed to satisfy the following condition (Equation 3) so that the angle is included in an angle of view from (φv−θv−θlv) to (φv+θv+θlv) of the camera unit 11.

$$\varphi v - \theta v - \theta lv \leq -A\tan((x+d1)/h1) \leq \varphi v + \theta v + \theta lv \quad \text{(Equation 3)}$$

It is possible for the camera unit 11 to image the horizontal direction with high resolution while imaging the prescribed region region1 on the rear of one side of the vehicle 1 by installing the camera unit 11 to satisfy an installation condition (a first condition) of Equations 2 and 3 above. Here, the one side of the vehicle 1 is a side of the passenger side.

Next, installation condition under which the camera unit 11 can image the horizontal direction with high resolution for the display for a front CTA will be described. In the display for a front CTA, it is desirable for the display to be performed so that an object approaching from a distant side in a left-right direction can be checked at an intersection with poor visibility. Therefore, in First Embodiment, the camera unit 11 is installed so that left-right horizontal directions can be appropriately checked in front of the viewpoint position E of the driver.

That is, since a distant side in the left-right horizontal direction continues to infinity, the camera unit is installed so that the camera unit can image a nearby object to the horizontal direction with high resolution. Here, an example of the installation condition (Equation 4 and Equation 5) as a second condition that allows the camera unit 11 to image at least one of the left-right horizontal directions in front of the viewpoint position E of the driver (driver seat) will be described by way of example.

In First Embodiment, if the camera unit 11 is in front of the viewpoint position E (x≥0), the camera unit 11 is installed so that Equation 4 or Equation 5 as the following installation condition (the second condition) s satisfied. That is, at least one of the high resolution regions 10a in the left-right direction ((φh−θh−θlh) to (φh−θlh) in a right direction toward the front of the vehicle and (φh+θlh) to (φh+θh+θlh) in a left direction toward the front of the vehicle) includes the left-right horizontal direction.

$$\varphi h - \theta h - \theta lh \leq -90° \leq \varphi h - \theta lh \quad \text{(Equation 4)}$$

$$\varphi h + \theta lh \leq 90° \leq \varphi h + \theta h + \theta lh \quad \text{(Equation 5)}$$

If the camera unit 11 is behind the viewpoint position E (x<0), it is desirable for the camera unit 11 to be installed so that a horizontal region in front of the viewpoint position E is included in the high resolution region. This installation allows the camera unit 11 to image any one of the vehicle sides in the horizontal direction with high resolution.

It is desirable for the camera unit 11 to be disposed at a position at which the vehicle 1 is not imaged at an optical axis center in order to image the left-right direction in front of the vehicle and the rear of the side of the vehicle. For example, it is desirable for an offset x of the camera unit to be larger than a distance d0 from the viewpoint position E to a front tip of the vehicle 1 in order to image the left-right direction in front of the vehicle.

Further, in order to image the rear of the vehicle side, it is desirable for an offset z of the camera unit 11 to be installed on the outer side (a −Z direction in FIG. 4) from the side of the vehicle 1.

As described above, the first condition of Equations 2 and 3 or the second condition of Equation 4 or 5 is satisfied so that any one of the rear of the side and the left-right direction of the vehicle 1 is included in the imaging angle of view. Further, it is desirable for the optical axis to be directed to a ground direction, in addition to the conditions of Equations 2 and 3 and Equations 4 and 5 above, in order to include a region under the front of the vehicle within the imaging angle of view.

Figure 6:
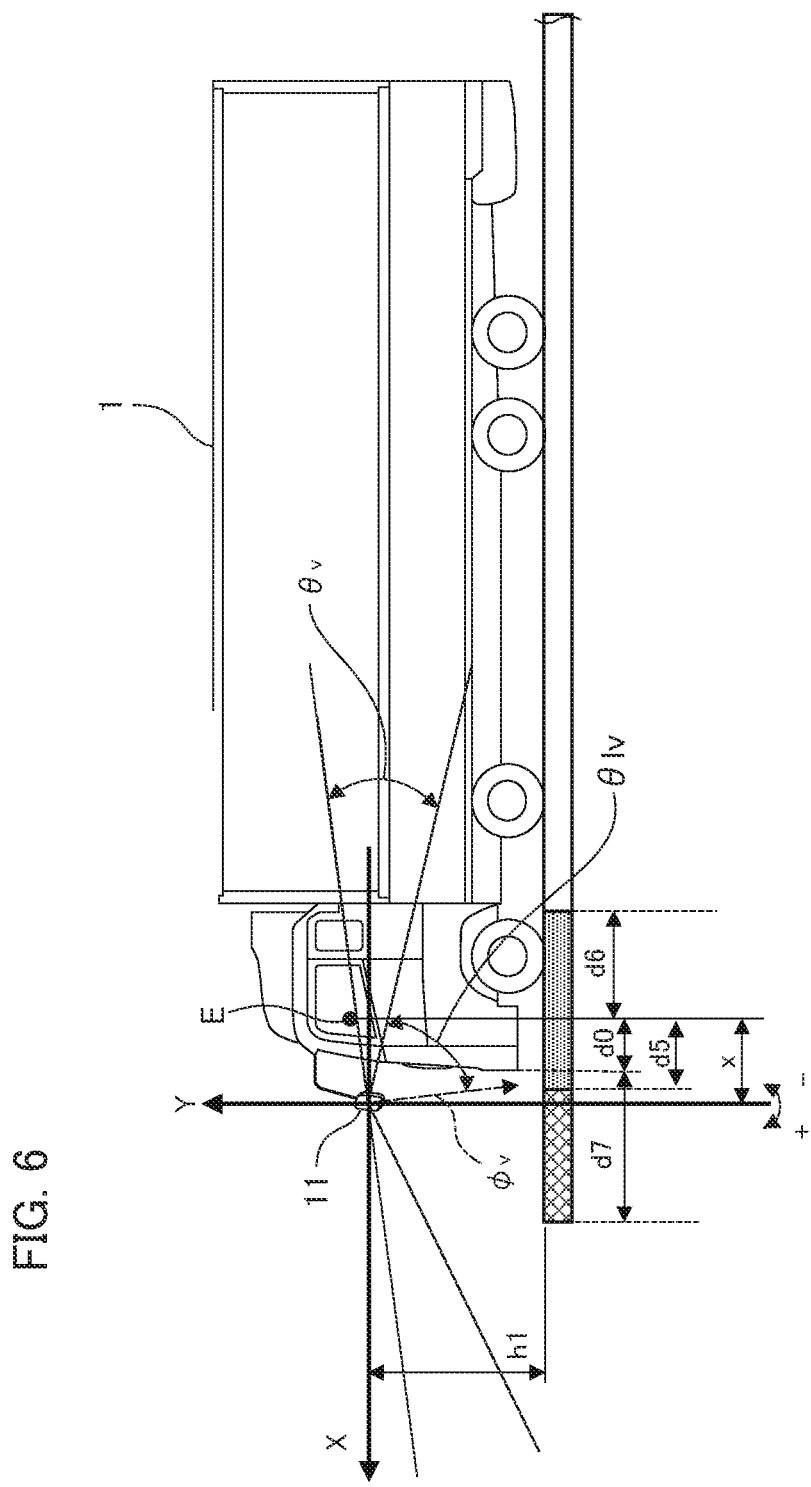
FIG. 6 is a side view of the vehicle 1 viewed from the side in First Embodiment.

An imaging region (a prescribed region under the front of the vehicle) necessary for a display of a region under the front used for the forward monitoring device will be described using FIGS. 6 to 8. FIG. 6 is a side view of the vehicle 1 viewed from the side in First Embodiment, and FIG. 7 is a front view of the vehicle 1 viewed from the front, for describing a relationship between the camera unit 11 and the vehicle 1 of First Embodiment.

Figure 7:
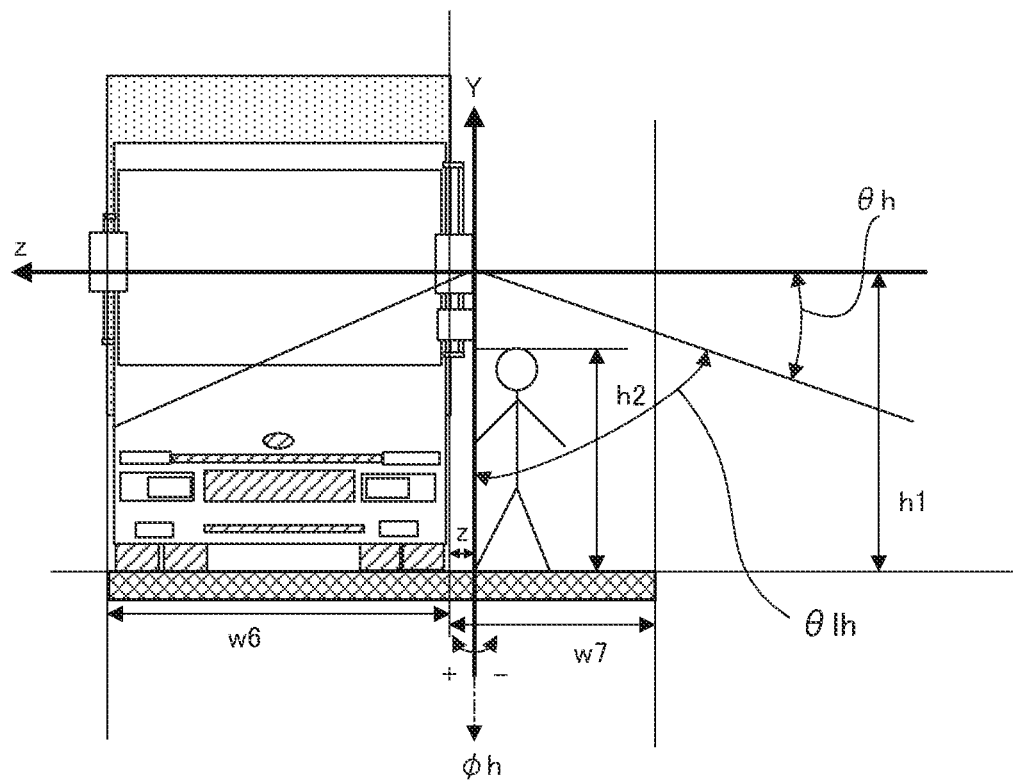
FIG. 7 is a front view of the vehicle 1 viewed from in front, for describing a relationship between the camera unit 11 and the vehicle 1 of First Embodiment.
Figure 8:
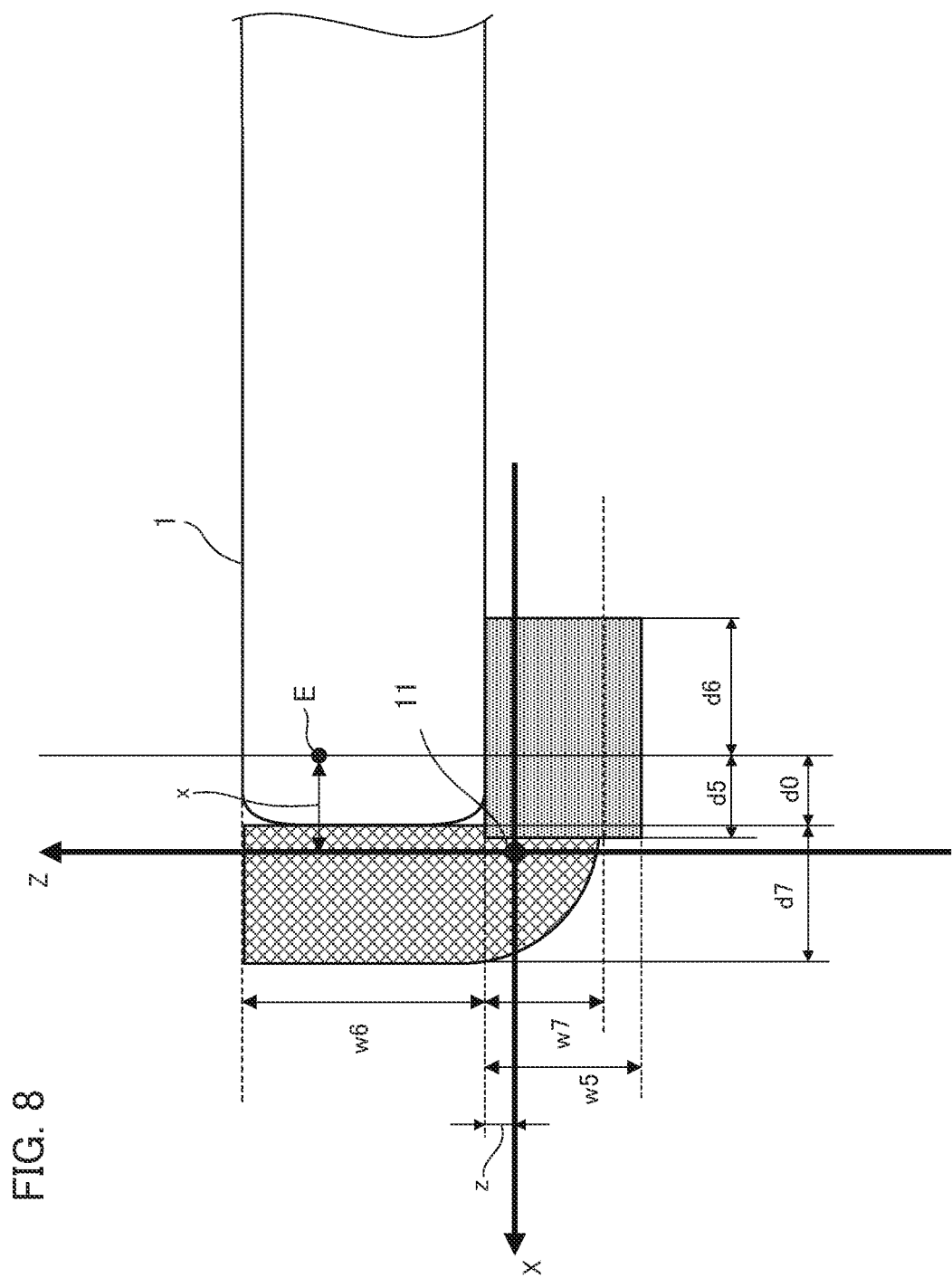
FIG. 8 is a plan view of the vehicle 1 viewed from above, for describing a prescribed region under a front of the vehicle in First Embodiment.

FIG. 8 is a plan view of the vehicle 1 viewed from above, for describing the prescribed region under the front of the vehicle in First Embodiment. X, Y, and Z directions and angles in FIGS. 6 to 8 correspond to those in FIGS. 4A, 4B, and 5, respectively, and have the same relationship.

E in FIGS. 6 and 8 denotes a viewpoint position of the driver, and a positional relationship (x, h1, z) between the camera unit 11 and the vehicle 1 in FIGS. 6 and 7, or a relationship ($\Phi v$, $\theta v$, $\theta lv$, $\Phi h$, $\theta h$, and $\theta lh$) between the optical axis and the imaging angle of view is the same as those in FIGS. 4A and 4B. Here, the prescribed region under the front of the vehicle will be described with reference to FIGS. 6 to 8.

The prescribed region under the front of the vehicle is a region that the driver needs to check with a side under mirror of the vehicle. Here, d7 is a distance from the tip of the vehicle 1 to a distant side under the front side to be checked, d0 is a distance from the viewpoint position E to the tip of the vehicle 1, w6 is a vehicle width of the vehicle 1, and w7 is a distance to a distant side of the side of the vehicle body to be checked.

That is, the prescribed region under the front of the vehicle is a region represented by a region on the ground surrounded by d7 and (w6+w7). Therefore, an installation condition under which the camera unit 11 can image the prescribed region in a downward direction in front of the vehicle 1 is a condition (a third condition) that a region surrounded by d7 and (w6+w7) is included in the imaging angle of view of the camera unit 11.

Therefore, in First Embodiment, the camera unit 11 is installed such that the installation condition (Equation 6 and Equation 7) as the third condition is satisfied so that an angle of view of a front end portion of d7 is included in an imaging angle of view ($\varphi v - \theta v - \theta lv$) to ($\varphi v + \theta v + \theta lv$) of the camera unit 11.

$$\varphi v - \theta v - \theta lv \leq -A \tan((x-d0)/h1) \leq \varphi v + \theta v + \theta lv \quad \text{(Equation 6)}$$

$$\varphi v - \theta v - \theta lv \leq A \tan((d0+d7-x)/h1) \leq \omega v + \theta v + \theta lv \quad \text{(Equation 7)}$$

Further, the camera unit 11 is installed such that the installation conditions (Equations 8 and 9) are satisfied so that end portions of w6 and w7 are included in a range (w6+w7) within the imaging angle of view of the camera unit 11.

$$\varphi h - \theta h - \theta lh \leq -A \tan((w6+z)/h1) \leq \varphi h + \theta h + \theta lh \quad \text{(Equation 8)}$$

$$\varphi h - \theta h - \theta lh \leq A \tan((w7-z)/h1) \leq \varphi h + \theta h + \theta lh \quad \text{(Equation 9)}$$

In Present Embodiment, by installing the imaging device in such an installation method, the camera unit 11 can realize a movable apparatus capable of imaging a wide range of the predetermined prescribed region under the front of the vehicle with high resolution. Further, Present Embodiment may not satisfy all of the first, second, and third conditions, and includes a case in which the installation is performed to satisfy at least one of the first to third conditions.

Figure 9:
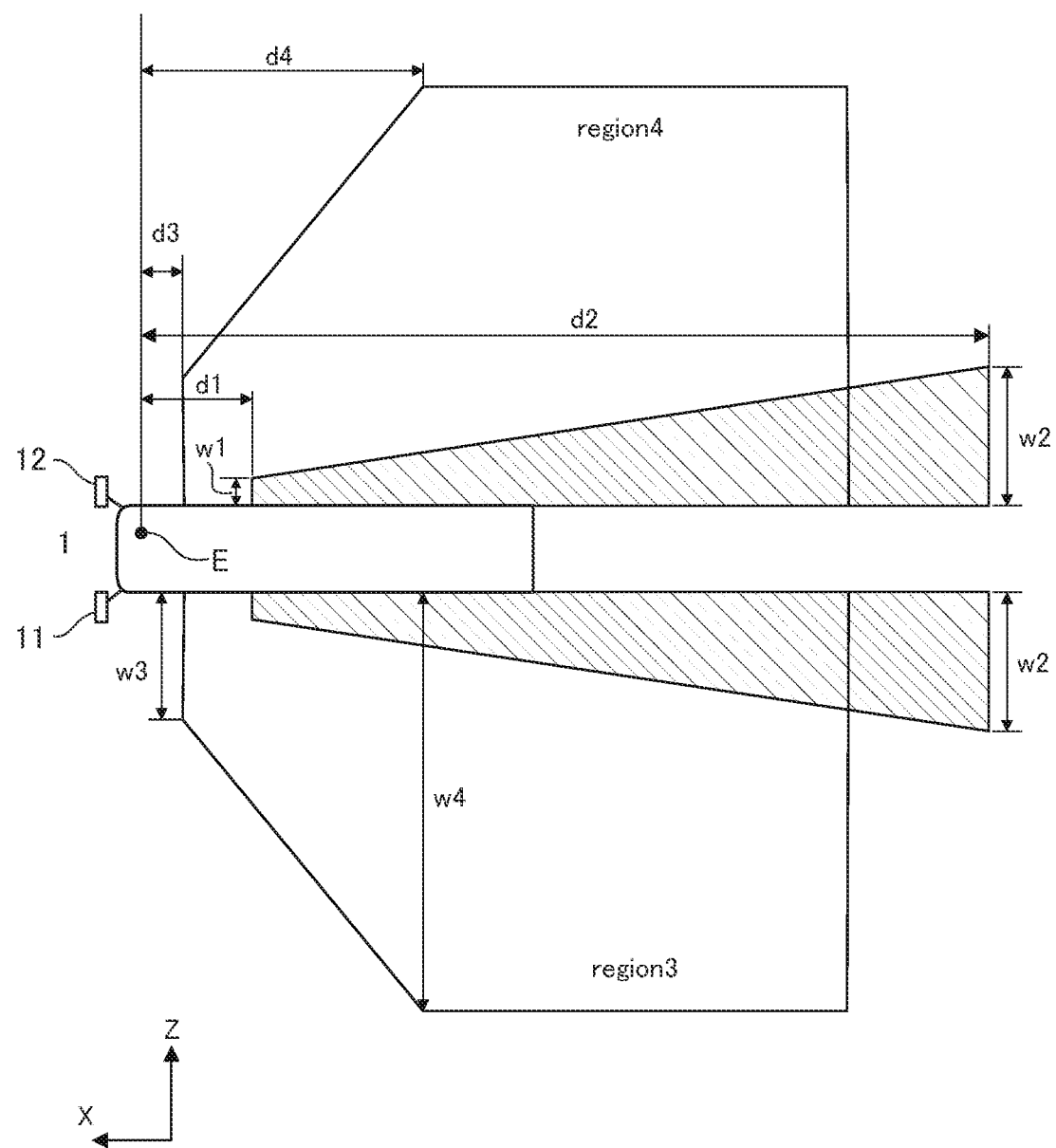
FIG. 9 is a plan view of the vehicle 1 viewed from above, for describing the prescribed region on the rear of the side of the vehicle in First Embodiment.

Further, in large vehicles, it is possible to check the field of view in a wider range than the prescribed region on the rear of the side of the vehicle (a prescribed wide region on the rear of the side of the vehicle). The prescribed wide region on the rear of the side of the vehicle will be described with reference to FIG. 9. FIG. 9 is a plan view of the vehicle 1 viewed from above, for describing the prescribed region on the rear of the side of the vehicle in First Embodiment. Regions on the ground on the sides and rear of the vehicle indicated by oblique lines in FIG. 9 are the same as the prescribed region on the rear of the side of the vehicle described in FIG. 5.

The prescribed wide region on the rear of the side of the vehicle is a region (region3 and region4) on a ground defined by a width w3 from the side of the vehicle body at a distance d3 behind the viewpoint position E of the driver and a width w4 from the side of the vehicle body at a distance d4 behind the viewpoint position E. The camera unit 11 disposed on the passenger seat side can correspond to an installation condition of a large vehicle by installing the camera unit 11 so that the prescribed wide region region3 on the rear of the side of the vehicle is included in the imaging range.

In particular, in a large vehicle, it is necessary to detect a movable apparatus on the side of the passenger seat of the vehicle and image a detection region for side collision warning for warning a driver if there is a possibility of a collision. This detection region is a region in which a possibility of an involvement or a collision is high if an object is in the detection region when a host vehicle is turning left, for example.

The camera unit 11 disposed on the passenger seat side is installed so that the detection region is included in the imaging range, making it possible to cope with an installation condition for detecting a movable apparatus on the passenger seat side.

Figure 10:
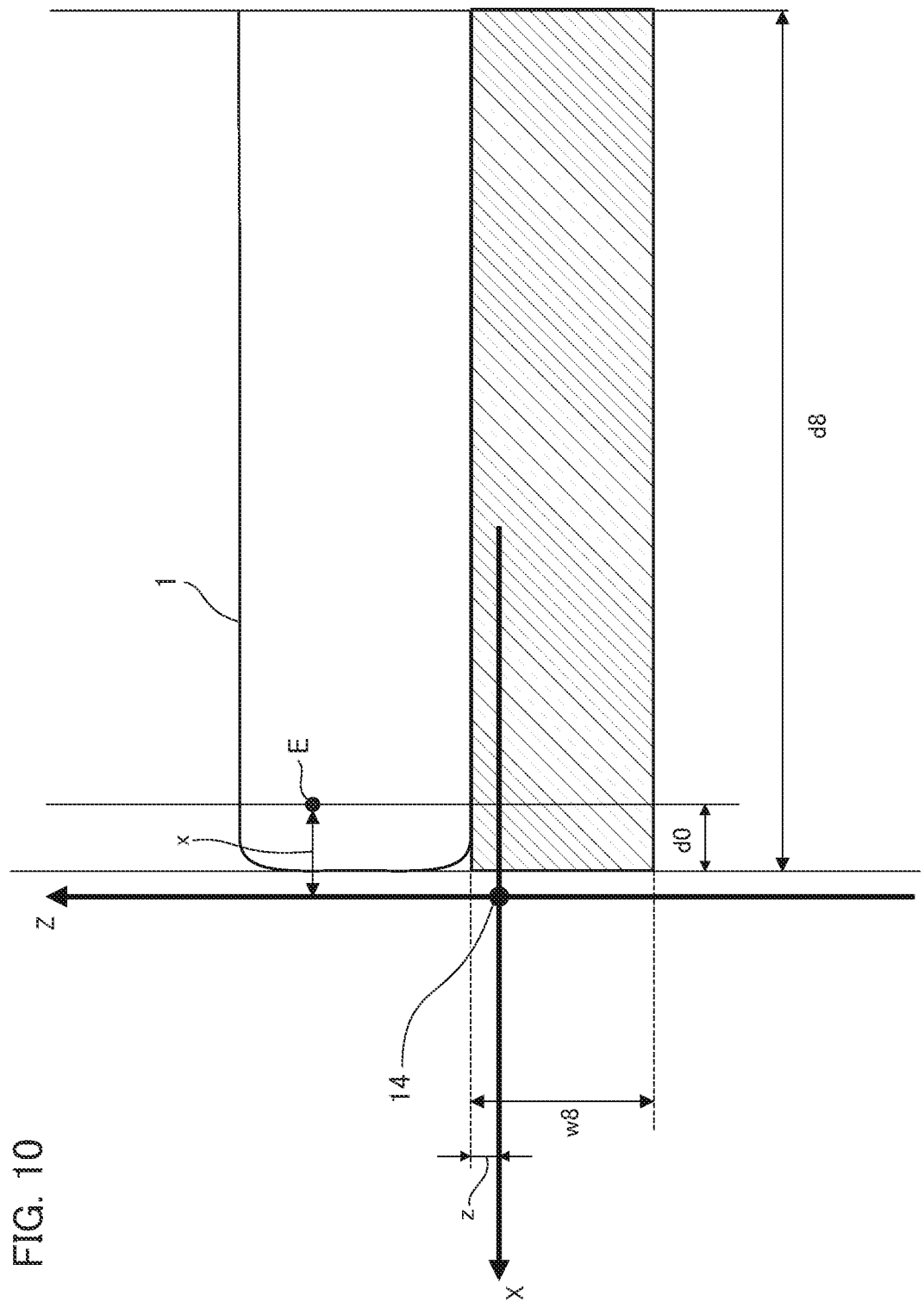
FIG. 10 is a schematic plan view of the vehicle 1 viewed from above in order to describe a prescribed region on a side of a passenger seat of the vehicle in First Embodiment.

A relationship between a prescribed region on the side of the passenger seat of the vehicle, and the detection region and the object will be described using FIGS. 10 and 11. FIG. 10 is a schematic plan view of the vehicle 1 viewed from above in order to describe the prescribed region on the side of the passenger seat of the vehicle in First Embodiment.

Figure 11:
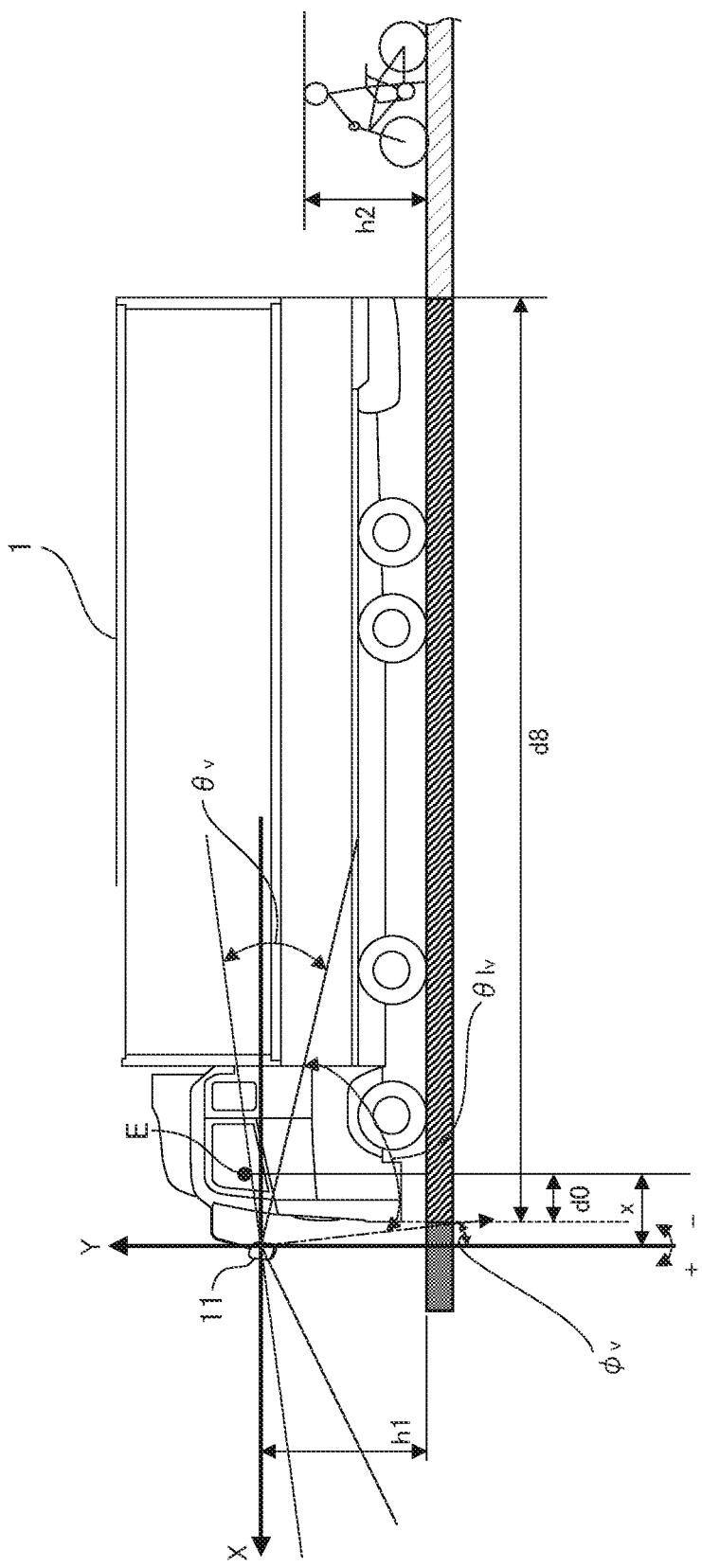
FIG. 11 is a side view of the vehicle 1 viewed from the side in First Embodiment.

FIG. 11 is a side view of the vehicle 1 viewed from the side in First Embodiment. X, Y, Z directions and angles in FIGS. 10 and 11 have the same relationship as in FIGS. 6 to 8. E illustrated in FIGS. 10 and 11 is the same as E illustrated in FIGS. 6 to 8, and represents a viewpoint position of the driver.

As illustrated in FIG. 10, the prescribed region on the side of the passenger seat of the vehicle is a region surrounded by a distance d8 from the front of the vehicle body to the rear of the vehicle body at which detection is required, and a distance w8 from the side of the vehicle body to a distant of the side of the vehicle body at which detection is required. The movable apparatus that needs to be detected is an object having a height h2. Therefore, the detection region for side collision warning is a region surrounded by the prescribed region on the side of the passenger seat of the vehicle and the height h2.

The camera unit 11 is installed so that the detection region for side collision warning is included in the angle of view, making it possible to cope with the installation condition of a large vehicle. It is desirable for the height h1 of the camera unit 11 to be greater than the height h2 of the movable apparatus that is a detection target. That is, it is desirable to satisfy a condition of Equation 10 below.

$$h1 \geq h2 \qquad \text{(Equation 10)}$$

Setting such an installation condition makes it possible to include a movable apparatus having the height h2 in the imaging range without making the imaging angle of view of the camera unit wider than under the condition of h1≤h2. For example, if a bicycle is the detection target, it is desirable to set h2 to 1.7 meters.

Further, if a pedestrian is the detection target, it is desirable to set h2 to 2 meters. If the offset x of the camera unit from the front end of the vehicle is large, it is necessary to include a ground of the entire region having a width w8 at that position in the imaging range in order to image the detection target within the detection region.

The installation condition for the camera unit 11 have been described above. It is desirable for the camera unit 11 to be disposed on the diagonally outer side in front of a corner of the vehicle body on the passenger seat side in order to image a plurality of required imaging ranges and high resolution imaging directions with high resolution using a smaller number of cameras.

Further, the installation condition for the camera unit 11 on the passenger side has been described. However, the camera unit 12 disposed on the driver seat side is installed under the same installation condition, making it possible to image the plurality of required imaging ranges and high resolution imaging directions with high resolution using a smaller number of cameras. It is possible to for the camera unit 12 to be disposed on the diagonally outer side in front of the corner of the vehicle body on the driver seat side.

Hereinafter, the camera unit 11 installed in front of the passenger seat will be described with actual specific values. For example, a passenger car with nine passengers or less or a small freight car (with a vehicle weight of 3.5 tons or less, for example) and a car with d0=0.8 m will be described.

In UN-R46, d1=4 m, d2=20 m, w1=1 m, and w2=4 m are defined as the prescribed region on the rear of the side of the vehicle. In UN-R46, d7=0.3 m, w6=1.8 m, and w7=0.3 m are defined as the prescribed region under the front of the vehicle. Further, in the Safety standards set by the Ministry of Land, Infrastructure and Transport (ground region of road vehicle safety standards Article 21 (driver seat) detailed notice Article 27 and Attachment 29), d7=2.3 m, d8=4.8 m, and w8=0.3 are defined.

It is desirable for the driver to be able to check these prescribed regions visually or with a mirror or display device. A specific example in which the camera unit 11 of Present Embodiment includes the ground region in the imaging region will be described.

For example, a case in which a camera unit having a vertical angle of view θv and a horizontal angle of view θh of 30.0 degrees and a vertical angle of view θlv and a horizontal angle of view θlh of 60 degrees in the high resolution region 10a is installed at a position of x=0.8 m, z=0 3 m, and h=1.2 m is assumed. In this case, the angle φv in the vertical direction and the angle φh in the horizontal direction of the optical axis of the camera unit may be $-28.56° < \varphi v < 0.0°$ and $-30.0° < \varphi h < 30.0°$ obtained from Equations 2 to 9 described above.

Further, for example, in the case of a large freight vehicle with a gross vehicle weight of 8.0 tons or more, it is desirable to be able to check a plurality of more regions. Therefore, it is desirable for the driver to be able to check a prescribed region of d0=1.0 m, d1=4 m, d2=30 m, d3=1.5 m, d4=10 m, d5=1 m, d6=1.75 m, d7=2 m, d8=12 m, w1=1 m, w2=5 m, w3=4.5 m, w4=15 m, w5=2 m, w6=2 m, w7=2 m, and w8=3 m to be similarly obtained, visually or with a mirror or a display device.

A specific example in which the camera unit 11 of Present Embodiment includes this region in the imaging region will be described. For example, a camera unit having a vertical angle of view θv and a horizontal angle of view θh of 23.6 degrees and a vertical angle of view θlv and a horizontal angle of view θlh of 66.4 degrees in the high resolution region 10a is used.

The camera unit may be installed at a position of x=1.2 m, z=0.3 m, and h=2.3 m so that the angle φv in the vertical direction of the optical axis of the camera unit is $-23.6° < \varphi v < 0.0°$ obtained from Equations, 2, 3, 7, and 10 described above.

Further, since it is desirable to include a horizontal direction of a left direction in the angle of view in order to image the rear of the side at a wide angle, it is desirable for the angle φh in the horizontal direction of the optical axis of the camera unit to be in $-23.6° < \varphi h < 0°$ obtained from Equations 4, 8, 9, and 10 described above.

In the above-described value examples, the installation position (x, z, h) of the camera unit has been set as a fixed condition and the angle condition of the optical axis of the camera unit in this case has been calculated, but the condition of Equations 2 and 3 need only be satisfied, and a calculation method for the installation condition is not limited thereto. For example, if the angle of the optical axis of the camera unit is determined as a vehicle design constraint in advance, a range of the installation position of the camera unit that satisfies the conditions of Equations 2 and 3 is determined on the basis of the angle.

This makes it possible to include the prescribed region in the imaging range of the high resolution region of the camera unit. Similarly, if an angle between the installation position (x, z, h) of the camera unit and the optical axis of the camera unit is determined in advance, the vertical angle of view θv and the horizontal angle of view θh of the high resolution region 10a of the camera unit satisfying the conditions of Equations 2 and 3 may be determined on the basis of the angle.

As described above, it is possible to image a plurality of prescribed regions with a single camera, and image two or more horizontal directions with high resolution.

Second Embodiment

Figure 2:
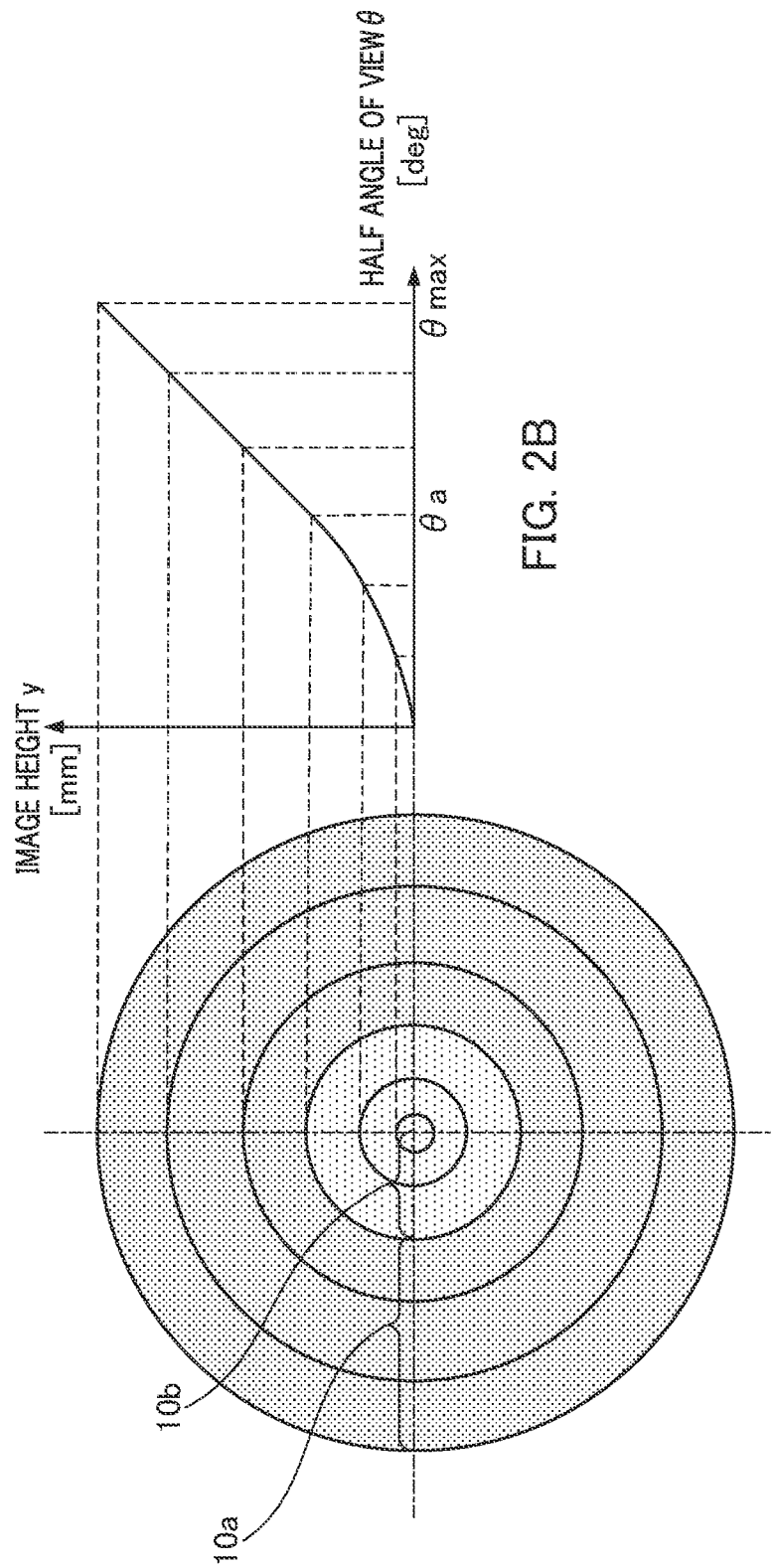
FIGS. 2A and 2B are diagrams illustrating optical characteristics of an optical system of a camera unit 11 in First Embodiment.
Figure 12:
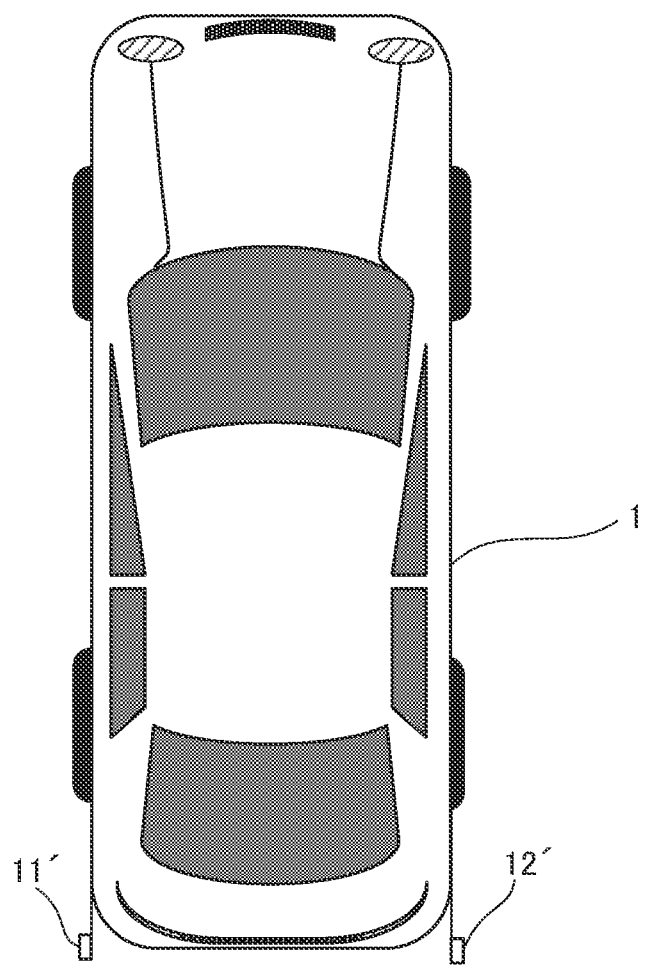
FIG. 12 is a diagram illustrating a positional relationship between a camera unit and a vehicle in Second Embodiment.

FIG. 12 is a diagram illustrating a positional relationship between the camera unit and the vehicle in the Second Embodiment. In Second Embodiment, the camera unit having the optical characteristics as illustrated in FIG. 2 is installed at a rear corner of the vehicle 1 as in FIG. 12.

In the second embodiment, an installation method for cameras capable of imaging a plurality of required imaging ranges and high resolution imaging directions with a smaller number of cameras than the number of directions in which high resolution imaging is required when a side on the rear is imaged will be described. Description of the parts already described in First Embodiment will be omitted.

First, installation condition under which a camera unit 11' serving as a second imaging device installed at the rear corner of the vehicle 1 can image the prescribed region region1 on the rear of the side of the vehicle as in First Embodiment will be described. It is assumed that, for example, characteristics of the optical system or imaging element of the camera unit 11 described in First Embodiment and the camera unit 11' are substantially the same.

That is, the second imaging device includes an optical system that forms an optical image having a low resolution region near an optical axis and a high resolution region outside the low resolution region on a light reception surface of the imaging element. Although the offset x between the camera unit 11 and the viewpoint position E of the driver is different, the same installation condition can be used.

That is, since a distant side of the prescribed region on the rear of the side of the vehicle extends to infinity behind the vehicle, the camera unit is installed so that the camera unit can image the infinity, that is, a horizontal direction of the width w2. Further, it is desirable for the camera unit to be installed so that the nearby ground to the horizontal direction can be imaged with high resolution, in order to check an object away from the driver with an image captured by a camera.

Further, installation in which a region w1 away by d1 from the viewpoint position E is included in the imaging angle of view, in addition to Equation 2, is performed so that the prescribed region region1 on the side of the vehicle is included in an imaging angle of view of the camera unit 11'.

Therefore, as an example of the installation, an installation satisfying condition 1 (Equation 2 and Equation 3) is desirable. That is, the camera unit 11' can image the horizontal direction with high resolution while imaging the prescribed region region1 on the side of the vehicle 1 in FIG. 5 by imaging the horizontal direction on the rear of one side of the vehicle 1 with the high resolution region of the optical system.

An installation condition under which the camera unit 11' can image the horizontal direction with high resolution for a display for a rear CTA will be described in detail. For the display for a rear CTA, a display allowing an object approaching from a distant side in a left-right direction to be checked at an intersection with poor visibility is required, and the camera unit 11' is required to be installed so that one direction in a left-right horizontal direction behind the viewpoint position E of the driver (driver seat) can be checked.

Since a distant side in the left-right horizontal direction continues to infinity, it is desirable for the camera unit to be installed so that the camera unit can image a nearby object to the horizontal direction with high resolution. An installation condition (Equation 4 and Equation 5) allowing the camera unit 11' to image at least one of the left-right horizontal directions behind the viewpoint position E of the driver will be described by way of example.

A case in which the camera unit 11' is behind the viewpoint position E (x<0) is considered. In this case, the camera unit 11' is installed so that at least one of the high resolution regions 10a in the left-right direction (($\varphi h-\theta h-\theta lh$) to ($\varphi h-\theta lh$) in a right direction toward the front of the vehicle, and ($\varphi h+\theta lh$) to ($\varphi h+\theta h+\theta lh$) in a left direction toward the front of the vehicle) includes the left-right horizontal direction.

Further, if the camera unit 11' is in front of the viewpoint position E (x≥0), the camera unit 11' is installed so that the horizontal region behind the viewpoint position E is included in the high resolution region. This installation makes it possible for the camera unit 11' to image any one of sides of the vehicle in the horizontal direction with high resolution.

It is desirable for the camera unit 11' to be disposed at a position at which the vehicle 1 is not imaged at an optical axis center in order to image the left-right direction in the rear of the vehicle and the rear of the side of the vehicle. For example, it is desirable for an offset x of the camera unit to be larger than a rear tip of the vehicle 1 in order to image the left-right direction behind the vehicle. Further, in order to image the rear of the vehicle side, it is desirable for an offset z of the camera unit 11' to be installed on the outer side (the −Z direction in FIG. 4) from the side of the vehicle 1.

As described above, the condition of Equations 2 and 3 or Equation 4 or 5 is satisfied so that any one of the rear of the side and the left-right direction of the vehicle 1 is included in the imaging angle of view. Further, it is desirable to satisfy the following fourth condition for including a downward direction behind the vehicle 1 in the imaging angle of view, in addition to the first condition of Equations 2 and 3 or the second condition of Equation 4 or 5.

However, Present Embodiment may satisfy any one of the first condition, the second condition, and the fourth condition.

Figure 13:
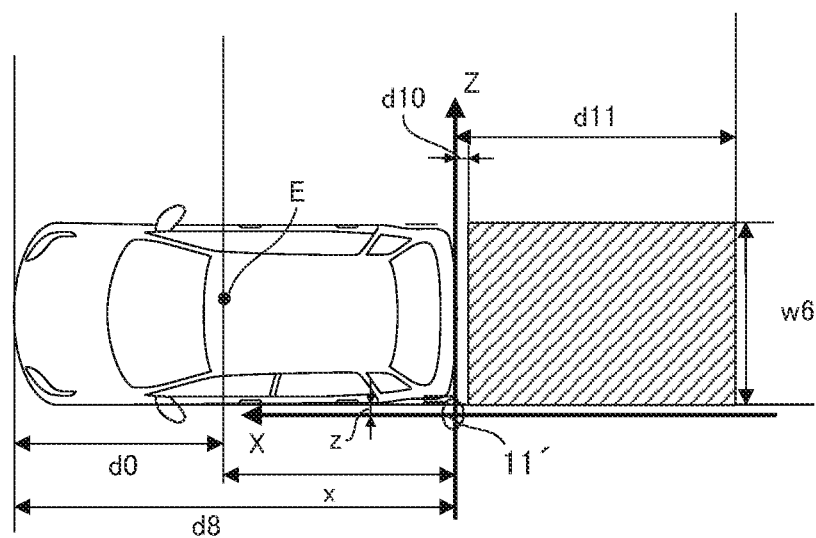
FIG. 13 is a plan view of a vehicle 1 viewed from above, for describing a prescribed region under a front of the vehicle in Second Embodiment.

The imaging region (a prescribed region under the rear of the vehicle) necessary for a display for a region under a rear used for a rear monitoring device will be described using FIG. 13. FIG. 13 is a plan view of the vehicle 1 viewed from above, for describing the prescribed region under the front of the vehicle in Second Embodiment.

X, Y, and Z directions and angles in FIG. 13 correspond to those in FIGS. 4A, 4B, and 5, respectively, and have the same relationship. E illustrated in FIG. 13 is the same as E illustrated in FIGS. 4A and 5, and denotes the viewpoint position of the driver'.

A positional relationship (x, h1, z) between the camera unit 11' and the vehicle 1 in FIG. 13, or a relationship ($\Phi v$, $\delta v$, $\theta lv$, $\Phi h$, $\theta h$, and $\theta lh$) between the optical axis and the imaging angle of view is the same as those in FIGS. 4A and 4B. d8 in FIG. 13 is a length (vehicle length) of the vehicle 1.

Here, the prescribed region under the rear of the vehicle will be described using FIG. 13. The prescribed region under the rear of the vehicle is a region that the driver needs to check on the display device when the vehicle reverses, a distance from a predetermined position on the front side to be checked, which is d10 away from the rear of the vehicle, to a predetermined position on the distant side to be checked is d11, and the vehicle width of the vehicle 1 is w6.

In this case, the prescribed region under the rear of the vehicle is a region represented by a region on the ground surrounded by d11 and w6, and it is desirable for the camera unit 11' to be able to image a target object at a height h3 within the predetermined prescribed region behind the vehicle 1 to be checked.

Therefore, the installation condition (the fourth condition) under which the camera unit 11' can image the prescribed region under the rear of the vehicle is a condition that a region surrounded by d11, w6, and the height h3 is included in the imaging angle of view of the camera unit 11'.

That is, the camera unit 11' is installed such that the following installation conditions (Equations 11, 12, and 14) or installation conditions (Equation 11, 13, and 15) are satisfied so that the above region is included within the imaging angle of view ($\varphi v-\theta v-\theta lv$) to ($\varphi v+\theta v+\theta lv$) of the camera unit 11'. z denotes a distance between the installation position (a second installation position) of the camera unit 11' and the side of the vehicle.

$$\varphi v-\theta v-\theta lv \leq -A\tan((d8-d0-x+d10)/h1) \leq \varphi v+\theta v+\theta lv \quad \text{(Equation 11)}$$

(when $h1 \geq h3$)

$$\varphi v-\theta v-\theta lv \leq -A\tan((d8-d0-x+d11)/(h1-h3)) \leq \varphi v+\theta v+\theta lv \quad \text{(Equation 12)}$$

(when $h1 < h3$)

$$\varphi v-\theta v-\theta lv \leq -A\tan((h3-h1)/(d8-d0-x+d11))-90° \leq \varphi v+\theta v+\theta lv \quad \text{(Equation 13)}$$

(when $h1 \geq h3$)

$$\varphi h-\theta h-\theta lh \leq A\tan((w6+z)/(h1-h3)) \leq \varphi h+\theta h+\theta lh \quad \text{(Equation 14)}$$

(when $h1 < h3$)

$$\varphi h-\theta h-\theta lh \leq A\tan((h3-h1)/(w6+z))+90° \leq \varphi h+\theta h+\theta lh \quad \text{(Equation 15)}$$

This installation allows the camera unit 11' to appropriately image the prescribed region in the downward direction behind the vehicle. In particular, in a large vehicle, it is necessary to detect a movable apparatus on the side of the passenger seat of the vehicle and image a detection region for side collision warning for warning the driver if there is a possibility of a collision.

This detection region is a region in which a possibility of an involvement or a collision is high if an object is in the detection region when a host vehicle is turning left, for example. The camera unit 11 disposed on the passenger seat side is installed so that the detection region is included in the imaging range, making it possible to cope with an installation condition for detecting a movable apparatus on the passenger seat side.

A relationship between a prescribed region on the side of the passenger seat of the vehicle, and the detection region and the object is the same as in FIGS. 10 and 11. Here, an installation condition under which the camera unit 11' can perform imaging with a range of width w5 and distance d5 illustrated in FIGS. 6 and 8 under the passenger seat of the vehicle as a prescribed region will be described.

For example, it is desirable to satisfy the following installation condition (Equation 16) so that the above region is included within the imaging angle of view (from $\varphi v-\theta v-\theta lv$ to $\varphi v+\theta v+\theta lv$) of the camera unit 11', in addition to Equations 8 and 10.

$$v-\theta v-\theta lv \leq A\tan((x+d5)/h1) \leq \varphi v+\theta v+\theta lv \quad \text{(Equation 16)}$$

Further, since it is necessary to display a video of a distant side behind the vehicle on the display unit so that the driver checks the rear of the vehicle with the electronic rearview mirror, it is desirable to image the prescribed region behind the vehicle with the high resolution region so that the driver can check up to the distant side.

Figure 14:
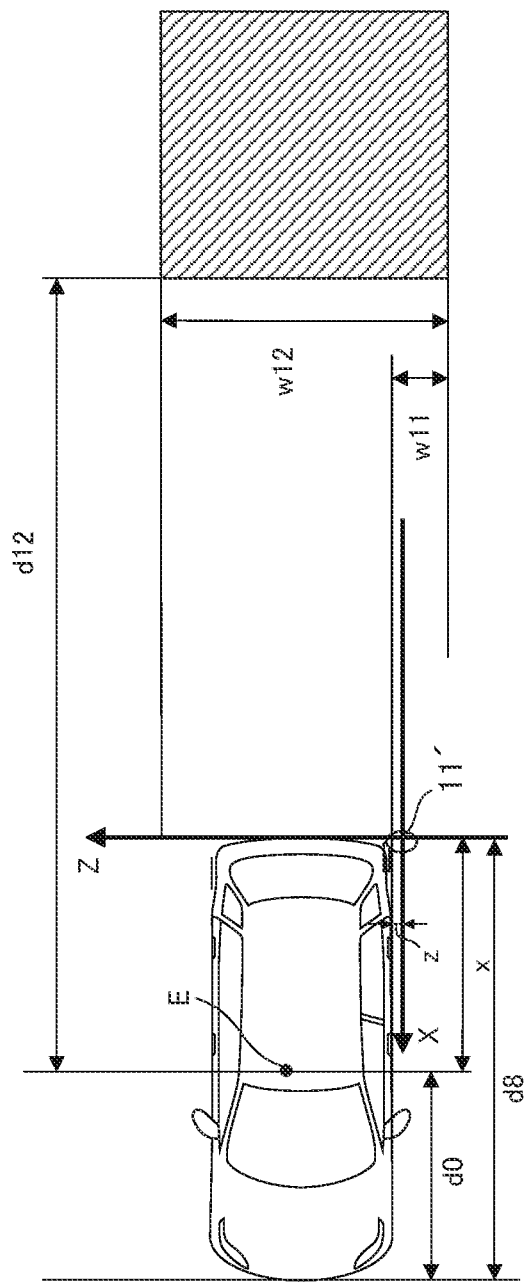
FIG. 14 is a diagram illustrating a prescribed region behind the vehicle in the Second Embodiment.

FIG. 14 is a diagram illustrating the prescribed region behind the vehicle in Second Embodiment. As illustrated in FIG. 14, the prescribed region behind the vehicle is a range of a width w12 and a distance d12. Further, a width from the side of the vehicle to the prescribed region is w11. Installation conditions under which the camera unit 11' can perform imaging will be described.

In order to image this prescribed region, for example, it is desirable to satisfy the installation conditions (equations 17 to 18) so that the region is included within the imaging angle of view ($\varphi v-\theta v-\theta lv$) to ($\varphi v+\theta v+\theta lv$) of the camera unit 11'.

$$\varphi v-\theta v-\theta lv \leq -A\tan((d12-x)/h1) \leq \varphi v-\theta lv \quad \text{(Equation 17)}$$

$$\varphi h-\theta h-\theta lh \leq A\tan((w12-w11-z)/h1) \leq \varphi h+\theta h+\theta lh \quad \text{(Equation 18)}$$

The installation condition for the camera unit 11' have been described above. Further, in order to image a plurality of required imaging ranges and high resolution imaging directions with a smaller number of cameras than the number of directions in which high resolution imaging is required, it is desirable for the camera unit 11' to be disposed on the outer side of a diagonally rear from the rear corner on the passenger seat side.

The installation condition for the camera unit 11' on the passenger side have been described above. Further, the camera unit 12' disposed on the driver seat side is disposed under the same installation condition, thereby making it possible to image a plurality of required imaging ranges and high resolution imaging directions on the driver seat side with a smaller number of cameras than the number of directions in which high resolution imaging is required. Further, it is desirable for the camera unit 12' to be disposed on the outer side of a diagonally rear from the rear corner on the driver seat side.

Hereinafter, actual specific values for the camera unit 11' on the passenger seat side will be described. For example, in the case of a passenger car with nine passengers or less or a small freight vehicle (for example, a vehicle weight of 3.5 tons or less), it is desirable for the driver to be able to check a prescribed region of d0=0.9 m, d1=4, d2=20 m, d8=4.8 m, d10=0.3 m, d11=3.5 m, d12=60 m, w1=1 m, w2=4 m, w5=0.3 m, w6=1.8 m, w11=9 m, and w12=20 m with an electronic side mirror.

In this case, for example, if the camera unit having a vertical angle of view $\theta v$ and a horizontal angle of view $\theta h$ of 23.6 degrees and a vertical angle of view $\theta lv$ and a horizontal angle of view $\theta lh$ of 66.4 degrees in the high resolution region 10a is used and the camera unit is installed at a position of x=3 m., z=0.3 m, and h=1.4 m, the angle $\varphi v$ in the vertical direction and the angle $\varphi h$ in the horizontal direction of the optical axis of the camera unit are $-22.2° < \varphi v < 0°$ and $-7.06° < \varphi h < 9.140$ obtained by Equations 2 to 5 and Equations 11 to 18 described above, respectively.

Further, for example, in the case of a large freight vehicle with a gross vehicle weight of 8.0 tons or more, it is desirable to be able to check a plurality of more regions, and thus, it is desirable for the driver to be able to check a prescribed region of d0=1 m, d1=4 m, d3=1.5 m, d4=10 m, d5=1 m, d6=1.75 m, d7=2 m, d8=12 m, d10=0.3 m, d11=3.5 m, d12=60 m, w1=1 m, w2=5 m, w3=4.5 m, w4=15 m, w5=2 m, w8=3 m, w6=2 m, w11=9 m, and w12=20 m with the electronic side mirror.

In this case, it is assumed that the camera unit having a vertical angle of view $\theta v$ and a horizontal angle of view $\theta h$ of 23.6 degrees and a vertical angle of view $\theta lv$ and a horizontal angle of view $\theta lh$ of 66.4 degrees in the high resolution region 10a has been used, and the camera unit has been installed at a position of x=12 m, z=0.2 m, and h=2 m. Then, the angle $\varphi v$ in the vertical direction of the optical axis of the camera unit is $-8.75° < \varphi v < 0°$ obtained by Equations 2, 3, 10, 11, 12, 13, 16, and 17 described above.

Further, since it is desirable to include a horizontal direction of a left direction in the angle of view in order to image the rear of the side at a wide angle, it is desirable for the angle $\varphi h$ in the horizontal direction of the optical axis of the camera unit to be $-9.87° < \varphi h < 0°$ obtained from Equations 4, 8, 10, 14, 15, and 18 described above.

In the above-described value examples, the installation position (x, z, h) of the camera unit has been set as a fixed condition and the angle condition of the optical axis of the camera unit in this case has been calculated, but the condition of Equations 2 and 3 need only be satisfied, and a calculation method for the installation condition is not limited thereto. For example, if the angle of the optical axis of the camera unit is determined as a vehicle design constraint in advance, a range of the installation position of the camera unit that satisfies the conditions of Equations 2 and 3 is determined on the basis of the angle.

This makes it possible to include the prescribed region in the imaging range of the high resolution region of the camera unit. Similarly, if an angle between the installation position (x, z, h) of the camera unit and the optical axis of the camera unit is determined in advance, the vertical angle of view $\theta v$ and the horizontal angle of view $\theta h$ of the high resolution region 10a of the camera unit satisfying the conditions of Equations 2 and 3 may be determined on the basis of the angle.

As described above, even in Present Embodiment, a plurality of prescribed regions can be imaged with a single camera, and two or more horizontal directions can be imaged with high resolution. In Present Embodiment, although a case in which the camera unit having the optical characteristics as illustrated in FIG. 2 has been disposed in the second installation position in the rear has been described, the camera unit may be combined with the camera unit disposed in front as in First Embodiment.

That is, for example, when the vehicle 1 is viewed from above, a total of four camera units may be disposed, two at both front corners and two at both rear corners. Alternatively, a total of two camera units may be installed, one at the front corner, for example, on the passenger seat side, and one at the rear corner on the driver seat side which is a diagonal position. Alternatively, two camera units may be disposed at the front corner and one camera unit may be disposed at the rear corner, or one camera unit may be disposed at the front corner and two camera units may be disposed at the rear corner.

At least part of the information processing system of the embodiment may or may not be mounted on a movable apparatus such as a vehicle. Further, the present invention can be applied to a case in which the movable apparatus is remotely controlled.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the movable apparatus through a network or various storage media. Then, a computer (or a CPU, an MPU, or the like) of the movable apparatus may be configured to read and execute the program. In such a case, the program and the storage medium storing the program configure the present invention.

Further, the present invention includes, for example, those realized using at least one processor or circuit configured to have the functions of the embodiments explained above. Distributed processing may be performed using a plurality of processors.

This application claims the benefit of Japanese Patent Application No. 2022-157148, filed on Sep. 29, 2022, which is hereby incorporated by reference herein in its entirety.

What is claimed is:

1. A movable apparatus, wherein an imaging device including an optical system forming an optical image having a low resolution region near an optical axis and a high resolution region outside the low resolution region on a light reception surface of an imaging element is installed at an installation position for imaging at least one of a horizontal direction in a rear of one side of the movable apparatus, one direction in a left-right horizontal direction behind a driver seat of the movable apparatus, and a downward direction behind the movable apparatus, with the high resolution region of the optical system, and wherein, for the imaging device, when an angle of the optical axis direction from the vertical direction when the movable apparatus is viewed from the side is $\varphi v$, an angle of view of the high resolution region is $\theta v$, an angle of view of the low resolution region is $\theta lv$, a distance between a viewpoint position of a driver and the installation position is x, a height of the installation position is h1, a distance from the viewpoint position to a tip of the movable apparatus is d0, a length of the movable apparatus is d8, a distance from the movable apparatus to a predetermined position on the front side to be checked in the rear is d10, a distance from the movable apparatus to a predetermined position on the distant side to be checked in the rear is d11, a width of the movable apparatus is w6, a height of a target object to be checked behind the movable apparatus is h3, and a distance between the installation position and the side of the movable apparatus is z, $\varphi v - \theta v - \theta lv \leq -\mathrm{Atan}((d8-d0-x+d10)/h1) \leq \varphi v + \theta v + \theta lv$ (when $h1 \geq h3$)

$\varphi v - \theta v - \theta lv \leq -\mathrm{Atan}((d8-d0-x+d11)/(h1-h3)) \leq \varphi v + \theta v + \theta lv$ (when $h1 < h3$)

$\varphi v - \theta v - \theta lv \leq -\mathrm{Atan}((h3-h1)/(d8-d0-x+d11)) - 90° \leq \varphi v + \theta v + \theta lv$ (when $h1 \geq h3$)

$\varphi h - \theta h - \theta lh \leq \mathrm{Atan}((w6+z)/(h1-h3)) \leq \varphi h + \theta h + \theta lh$ (when $h1 < h3$)

$\varphi h - \theta h - \theta lh \leq \mathrm{Atan}((h3-h1)/(w6+z)) + 90° \leq n\varphi h + \theta h + \theta lh$ are satisfied.

* * * * *